United States Patent
Bizjak

(10) Patent No.: US 8,038,771 B2
(45) Date of Patent: Oct. 18, 2011

(54) SYSTEMS AND METHODS FOR REGULATING HEATING ASSEMBLY OPERATION THROUGH PRESSURE SWING ADSORPTION PURGE CONTROL

(75) Inventor: Travis A. Bizjak, Bend, OR (US)

(73) Assignee: Idatech, LLC, Bend, OR (US)

( * ) Notice: Subject to any disclaimer, the term of this patent is extended or adjusted under 35 U.S.C. 154(b) by 0 days.

(21) Appl. No.: 12/903,061

(22) Filed: Oct. 12, 2010

(65) Prior Publication Data

US 2011/0023708 A1  Feb. 3, 2011

Related U.S. Application Data

(63) Continuation of application No. 12/171,098, filed on Jul. 10, 2008, now Pat. No. 7,833,326, which is a continuation of application No. 11/058,307, filed on Feb. 14, 2005, now Pat. No. 7,399,342.

(60) Provisional application No. 60/638,451, filed on Dec. 22, 2004.

(51) Int. Cl.
*B01D 53/02* (2006.01)

(52) U.S. Cl. ............ 95/98; 95/99; 95/100; 95/103; 95/143; 95/148

(58) Field of Classification Search ............. 95/96, 99, 95/100, 103, 143, 148; 96/126, 130; 48/61, 48/197 R
See application file for complete search history.

(56) References Cited

U.S. PATENT DOCUMENTS

| | | |
|---|---|---|
| 2,751,034 A | 6/1956 | Ringo et al. |
| 3,487,608 A | 1/1970 | Gräff |
| 3,564,816 A | 2/1971 | Batta |
| 3,986,849 A | 10/1976 | Fuderer et al. |
| 4,038,054 A | 7/1977 | Gräff |
| 4,272,265 A | 6/1981 | Snyder |
| 4,402,712 A | 9/1983 | Benkmann |
| 4,406,675 A | 9/1983 | Dangieri et al. |
| 4,452,612 A | 6/1984 | Mattia |
| 4,469,494 A | 9/1984 | van Weenen |
| 4,693,730 A | 9/1987 | Miller et al. |
| 4,758,253 A | 7/1988 | Davidson et al. |
| 4,787,417 A | 11/1988 | Windsor, Jr. |
| 4,925,464 A | 5/1990 | Rabenau et al. |

(Continued)

FOREIGN PATENT DOCUMENTS

CA  2516989  9/2004

(Continued)

*Primary Examiner* — Robert A Hopkins

(74) *Attorney, Agent, or Firm* — Dascenzo Intellectual Property Law, P.C.

(57) ABSTRACT

Pressure swing adsorption (PSA) assemblies with purge control systems, and hydrogen-generation assemblies and/or fuel cell systems containing the same. The PSA assemblies are operated according to a PSA cycle to produce a product hydrogen stream and a byproduct stream from a mixed gas stream. The byproduct stream may be delivered as a fuel stream to a heating assembly, which may heat the hydrogen-producing region that produces the mixed gas stream. The PSA assemblies may be adapted to regulate the flow of purge gas utilized therein, such as according to a predetermined, non-constant profile. In some embodiments, the flow of purge gas is regulated to maintain the flow rate and/or fuel value of the byproduct stream at or within a determined range of a threshold value, and/or to regulate the flow of purge gas to limit the concentration of carbon monoxide in a heated exhaust stream produced from the byproduct stream.

27 Claims, 5 Drawing Sheets

U.S. PATENT DOCUMENTS

| | | | |
|---|---|---|---|
| 4,941,894 A | 7/1990 | Black | |
| 4,968,334 A | 11/1990 | Hilton | |
| 5,112,367 A | 5/1992 | Hill | |
| 5,114,441 A | 5/1992 | Kanner et al. | |
| 5,133,784 A | 7/1992 | Boudet et al. | |
| 5,176,722 A | 1/1993 | Lemcoff et al. | |
| 5,256,172 A | 10/1993 | Keefer | |
| 5,256,174 A | 10/1993 | Kai et al. | |
| 5,268,021 A | 12/1993 | Hill et al. | |
| 5,296,017 A | 3/1994 | Kono et al. | |
| 5,366,541 A | 11/1994 | Hill et al. | |
| 5,441,559 A | 8/1995 | Petit et al. | |
| RE35,099 E | 11/1995 | Hill | |
| 5,487,775 A | 1/1996 | LaCava et al. | |
| 5,593,478 A | 1/1997 | Hill et al. | |
| 5,730,778 A | 3/1998 | Hill et al. | |
| 5,807,423 A | 9/1998 | Lemcoff et al. | |
| 5,814,130 A | 9/1998 | Lemcoff et al. | |
| 5,814,131 A | 9/1998 | Lemcoff et al. | |
| 5,820,656 A | 10/1998 | Lemcoff et al. | |
| 5,861,137 A | 1/1999 | Edlund | |
| 5,891,217 A | 4/1999 | Lemcoff et al. | |
| 5,961,928 A | 10/1999 | Maston et al. | |
| 5,979,440 A | 11/1999 | Honkonen et al. | |
| 5,997,594 A | 12/1999 | Edlund et al. | |
| 6,045,933 A | 4/2000 | Okamoto | |
| 6,051,050 A | 4/2000 | Keefer et al. | |
| 6,056,804 A | 5/2000 | Keefer et al. | |
| 6,063,161 A | 5/2000 | Keefer et al. | |
| 6,068,680 A | 5/2000 | Kulish et al. | |
| 6,143,056 A | 11/2000 | Smolarek et al. | |
| 6,168,422 B1 | 1/2001 | Motyka et al. | |
| 6,176,897 B1 | 1/2001 | Keefer | |
| 6,221,117 B1 | 4/2001 | Edlund et al. | |
| 6,311,719 B1 | 11/2001 | Hill et al. | |
| 6,379,645 B1 | 4/2002 | Bucci et al. | |
| 6,406,523 B1 | 6/2002 | Connor et al. | |
| 6,425,938 B1 | 7/2002 | Xu et al. | |
| 6,451,095 B1 | 9/2002 | Keefer et al. | |
| 6,457,485 B2 | 10/2002 | Hill et al. | |
| 6,471,744 B1 | 10/2002 | Hill | |
| 6,483,001 B2 | 11/2002 | Golden et al. | |
| 6,497,856 B1 | 12/2002 | Lomax, Jr. et al. | |
| 6,514,318 B2 | 2/2003 | Keefer | |
| 6,514,319 B2 | 2/2003 | Keefer et al. | |
| 6,565,627 B1 | 5/2003 | Golden et al. | |
| 6,576,043 B2 | 6/2003 | Zwilling et al. | |
| 6,623,719 B2 | 9/2003 | Lomax, Jr. et al. | |
| 6,627,338 B2 | 9/2003 | St-Pierre et al. | |
| 6,635,372 B2 | 10/2003 | Gittleman | |
| 6,651,653 B1 | 11/2003 | Honkonen et al. | |
| 6,658,894 B2 | 12/2003 | Golden et al. | |
| 6,660,064 B2 | 12/2003 | Golden et al. | |
| 6,681,764 B1 | 1/2004 | Honkonen et al. | |
| 6,691,702 B2 | 2/2004 | Appel et al. | |
| 6,692,545 B2 | 2/2004 | Gittleman et al. | |
| 6,698,423 B1 | 3/2004 | Honkonen et al. | |
| 6,699,307 B1 | 3/2004 | Lomax, Jr. | |
| 6,712,087 B2 | 3/2004 | Hill et al. | |
| RE38,493 E | 4/2004 | Keefer et al. | |
| 6,740,258 B1 | 5/2004 | Wyschofsky et al. | |
| 6,755,895 B2 | 6/2004 | Lomax, Jr. et al. | |
| 6,770,390 B2 | 8/2004 | Golden et al. | |
| 6,814,787 B2 | 11/2004 | Golden et al. | |
| 7,828,864 B2 * | 11/2010 | Edlund et al. | 48/197 R |
| 2001/0045061 A1 | 11/2001 | Edlund et al. | |
| 2002/0004157 A1 | 1/2002 | Keefer et al. | |
| 2002/0085970 A1 | 7/2002 | Sederquist et al. | |
| 2002/0114747 A1 | 8/2002 | Marchand et al. | |
| 2002/0127442 A1 | 9/2002 | Connor et al. | |
| 2002/0168306 A1 | 11/2002 | Gittleman | |
| 2003/0008186 A1 | 1/2003 | Dickman et al. | |
| 2003/0070550 A1 | 4/2003 | Keefer et al. | |
| 2003/0143448 A1 | 7/2003 | Keefer | |
| 2003/0157390 A1 | 8/2003 | Keefer et al. | |
| 2003/0192251 A1 | 10/2003 | Edlund et al. | |
| 2003/0196550 A1 | 10/2003 | Keefer et al. | |
| 2003/0205131 A1 | 11/2003 | Golden et al. | |
| 2003/0223926 A1 | 12/2003 | Edlund et al. | |
| 2004/0005492 A1 | 1/2004 | Keefer et al. | |
| 2004/0011198 A1 | 1/2004 | Keefer et al. | |
| 2004/0074388 A1 | 4/2004 | Lomax, Jr. | |
| 2004/0131911 A1 | 7/2004 | Kaufmann et al. | |
| 2004/0131912 A1 | 7/2004 | Keefer et al. | |
| 2004/0163534 A1 | 8/2004 | Lomax, Jr. | |
| 2004/0197616 A1 | 10/2004 | Edlund et al. | |
| 2004/0250472 A1 | 12/2004 | Okada et al. | |
| 2007/0033949 A1 | 2/2007 | Raybold et al. | |

FOREIGN PATENT DOCUMENTS

| | | |
|---|---|---|
| EP | 1146009 A1 | 10/2001 |
| JP | 11-1301 | 1/1999 |
| JP | 2000-281308 | 10/2000 |
| JP | 2002-020102 | 1/2002 |
| JP | 2002-324567 | 11/2002 |
| JP | 2004-501759 | 1/2004 |

* cited by examiner

US 8,038,771 B2

SYSTEMS AND METHODS FOR REGULATING HEATING ASSEMBLY OPERATION THROUGH PRESSURE SWING ADSORPTION PURGE CONTROL

RELATED APPLICATIONS

This application is a continuing patent application that claims priority to U.S. patent application Ser. No. 12/171,098, which was filed on Jul. 10, 2008, issued on Nov. 16, 2010 as U.S. Pat. No. 7,833,326, and which is a continuing patent application that claims priority to U.S. patent application Ser. No. 11/058,307 which was filed on Feb. 14, 2005, issued on Jul. 15, 2008 as U.S. Pat. No. 7,399,342, and which claims priority to U.S. Provisional Patent Application Ser. No. 60/638,451, which was filed on Dec. 22, 2004. The complete disclosures of the above-identified patents and patent applications are hereby incorporated by reference.

FIELD OF THE DISCLOSURE

The present disclosure is directed generally to hydrogen-generation assemblies that include pressure swing adsorption assemblies, and more particularly to systems and methods for regulating heating assembly operation in hydrogen-generation assemblies through control of the purge cycle of the pressure swing adsorption assemblies.

BACKGROUND OF THE DISCLOSURE

A hydrogen-generation assembly is an assembly that includes a fuel processing system that is adapted to convert one or more feedstocks into a product stream containing hydrogen gas as a majority component. The produced hydrogen gas may be used in a variety of applications. One such application is energy production, such as in electrochemical fuel cells. An electrochemical fuel cell is a device that converts a fuel and an oxidant to electricity, a reaction product, and heat. For example, fuel cells may convert hydrogen and oxygen into water and electricity. In such fuel cells, the hydrogen is the fuel, the oxygen is the oxidant, and the water is the reaction product. Fuel cells typically require high purity hydrogen gas to prevent the fuel cells from being damaged during use. The product stream from the fuel processing system of a hydrogen-generation assembly may contain impurities, illustrative examples of which include one or more of carbon monoxide, carbon dioxide, methane, unreacted feedstock, and water. Therefore, there is a need in many conventional fuel cell systems to include suitable structure for removing impurities from the impure hydrogen stream produced in the fuel processing system.

A pressure swing adsorption (PSA) process is an example of a mechanism that may be used to remove impurities from an impure hydrogen gas stream by selective adsorption of one or more of the impurities present in the impure hydrogen stream. The adsorbed impurities can be subsequently desorbed and removed from the PSA assembly. PSA is a pressure-driven separation process that utilizes a plurality of adsorbent beds. The beds are cycled through a series of steps, such as pressurization, separation (adsorption), depressurization (desorption), and purge steps to selectively remove impurities from the hydrogen gas and then desorb the impurities.

Many hydrogen-generation assemblies include a heating assembly that combusts at least one fuel stream with air to produce a heated exhaust stream for heating at least a portion of the hydrogen-generation assembly. The fuel streams may come from a variety of sources, including the PSA assembly. However, PSA assemblies are operated in PSA cycles that tend to produce exhaust, or byproduct, streams having varying and intermittent flows and/or varying fuel values. When used as a fuel stream for a heating assembly, this variation in flow rate and/or fuel value may produce inconsistent, often unpredictable, results in the heating assembly, such as periods of no fuel, periods of insufficient fuel, periods of too much fuel, periods in which the fuel streams have variable fuel values, etc. As a result, it may be difficult for the heating assembly to maintain a selected component of the hydrogen-generation assembly at a desired temperature or within a desired, or selected, temperature range. Similarly, at times, the PSA assembly may not be producing sufficient, or any, exhaust stream to maintain a flame or other ignition source of a heating assembly in operation.

SUMMARY OF THE DISCLOSURE

The present disclosure is directed to PSA assemblies with purge control systems, as well as to hydrogen-generation assemblies and/or fuel cell systems containing the same, and to methods of operating the same. The PSA assemblies include at least one adsorbent bed, and typically a plurality of adsorbent beds, that include an adsorbent region including adsorbent adapted to remove impurities from a mixed gas stream containing hydrogen gas as a majority component and other gases. The mixed gas stream may be produced by a hydrogen-producing region of a fuel processing system, and the PSA assembly may produce a product hydrogen stream that is consumed by a fuel cell stack to provide a fuel cell system that produces electrical power. The PSA assembly produces a byproduct stream containing impurities removed from the mixed gas stream and a purge gas, which may be hydrogen gas, and a heating assembly may be adapted to receive the byproduct stream as a fuel stream for generating a heated exhaust stream. The heated exhaust stream may be adapted to heat at least the hydrogen-producing region of a fuel processing system, such as to maintain the region at a suitable temperature or within a suitable temperature range for producing the mixed gas stream. The PSA assembly is adapted to regulate the flow of purge gas to the adsorbent beds during the purge steps of a PSA cycle. In some embodiments, the purge gas is selectively delivered according to a predetermined, non-constant profile. In some embodiments the profile includes an initial flow rate that is less than the average flow rate of purge gas, and at least a subsequent flow rate that is greater than the average flow rate. In some embodiments, the flow of purge gas is regulated to maintain the flow rate and/or fuel value of the byproduct stream at or within a determined range of a threshold value. In some embodiments, the flow of purge gas is regulated to limit the concentration of carbon monoxide in a heated exhaust stream produced from the byproduct stream. In some embodiments, the PSA assembly includes a controller adapted to regulate the operation of at least the PSA assembly.

DETAILED DESCRIPTION AND BEST MODE OF THE DISCLOSURE

Figure 1:
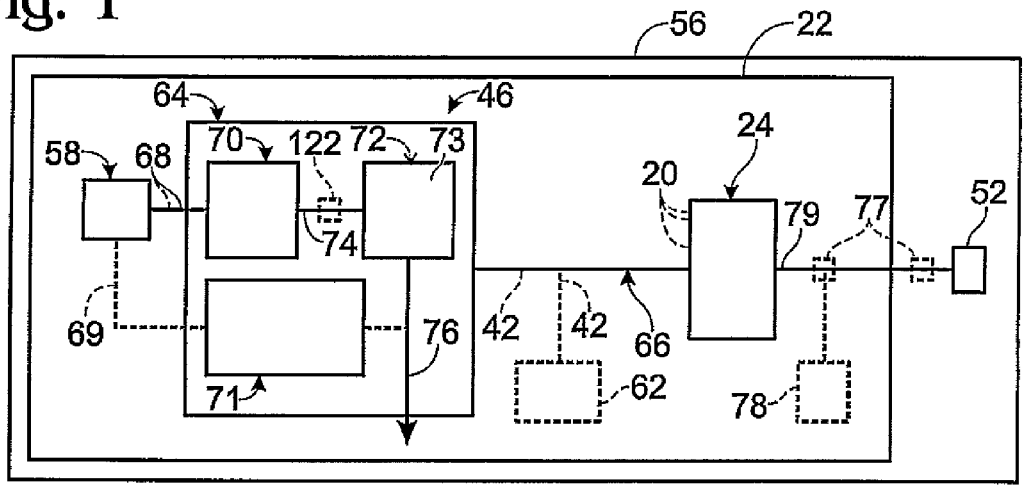
FIG. 1 is a schematic view of an illustrative example of an energy producing and consuming assembly that includes a hydrogen-generation assembly with an associated feedstock delivery system and a fuel processing system, as well as a fuel cell stack, and an energy-consuming device.

FIG. 1 illustrates schematically an example of an energy producing and consuming assembly 56. The energy producing and consuming assembly 56 includes an energy-producing system 22 and at least one energy-consuming device 52 adapted to exert an applied load on the energy-producing system 22. In the illustrated example, the energy-producing system 22 includes a fuel cell stack 24 and a hydrogen-generation assembly 46. More than one of any of the illustrated components may be used without departing from the scope of the present disclosure. The energy-producing system may include additional components that are not specifically illustrated in the schematic figures, such as air delivery systems, heat exchangers, sensors, controllers, flow-regulating devices, fuel and/or feedstock delivery assemblies, heating assemblies, cooling assemblies, and the like. System 22 may also be referred to as a fuel cell system.

As discussed in more detail herein, hydrogen-generation assemblies and/or fuel cell systems according to the present disclosure include a separation assembly that includes at least one pressure swing adsorption (PSA) assembly that is adapted to increase the purity of the hydrogen gas that is produced in the hydrogen-generation assembly and/or consumed in the fuel cell stack. In a PSA process, gaseous impurities are removed from a stream containing hydrogen gas. PSA is based on the principle that certain gases, under the proper conditions of temperature and pressure, will be adsorbed onto an adsorbent material more strongly than other gases. These impurities may thereafter be desorbed and removed, such as in the form of a byproduct stream. The success of using PSA for hydrogen purification is due to the relatively strong adsorption of common impurity gases (such as, but not limited to, $CO$, $CO_2$, hydrocarbons including $CH_4$, and $N_2$) on the adsorbent material. Hydrogen adsorbs only very weakly and so hydrogen passes through the adsorbent bed while the impurities are retained on the adsorbent material.

As discussed in more detail herein, a PSA process typically involves repeated, or cyclical, application of at least pressurization, separation (adsorption), depressurization (desorption), and purge steps, or processes, to selectively remove impurities from the hydrogen gas and then desorb the impurities. Accordingly, the PSA process may be described as being adapted to repeatedly enable a PSA cycle of steps, or stages, such as the above-described steps. The degree of separation is affected by the pressure difference between the pressure of the mixed gas stream and the pressure of the byproduct stream. Accordingly, the desorption step will typically include reducing the pressure within the portion of the PSA assembly containing the adsorbed gases, and optionally may even include drawing a vacuum (i.e., reducing the pressure to less than atmospheric or ambient pressure) on that portion of the assembly. Similarly, increasing the feed pressure of the mixed gas stream to the adsorbent regions of the PSA assembly may beneficially affect the degree of separation during the adsorption step.

As illustrated schematically in FIG. 1, the hydrogen-generation assembly 46 includes at least a fuel processing system 64 and a feedstock delivery system 58, as well as the associated fluid conduits interconnecting various components of the system. As used herein, the term "hydrogen-generation assembly" may be used to refer to the fuel processing system 64 and associated components of the energy-producing system, such as feedstock delivery systems 58, heating assemblies, separation regions or devices, air delivery systems, fuel delivery systems, fluid conduits, heat exchangers, cooling assemblies, sensor assemblies, flow regulators, controllers, etc. All of these illustrative components are not required to be included in any hydrogen-generation assembly or used with any fuel processing system according to the present disclosure. Similarly, other components may be included or used as part of the hydrogen-generation assembly.

Regardless of its construction or components, the feedstock delivery system 58 is adapted to deliver to the fuel processing system 64 one or more feedstocks via one or more streams, which may be referred to generally as feedstock supply stream(s) 68. In the following discussion, reference may be made only to a single feedstock supply stream, but is within the scope of the present disclosure that two or more such streams, of the same or different composition, may be used. In some embodiments, air may be supplied to the fuel processing system 64 via a blower, fan, compressor or other suitable air delivery system, and/or a water stream may be delivered from a separate water source.

Fuel processing system 64 includes any suitable device(s) and/or structure(s) that are configured to produce hydrogen gas from the feedstock supply stream(s) 68. As schematically illustrated in FIG. 1, the fuel processing system 64 includes a hydrogen-producing region 70. Accordingly, fuel processing system 64 may be described as including a hydrogen-producing region 70 that produces a hydrogen-rich stream 74 that includes hydrogen gas as a majority component from the feedstock supply stream. While stream 74 contains hydrogen gas as its majority component, it also contains other gases, and as such may be referred to as a mixed gas stream that contains hydrogen gas and other gases. Illustrative, non-exclusive examples of these other gases, or impurities, include one or more of such illustrative impurities as carbon monoxide, carbon dioxide, water, methane, and unreacted feedstock.

Illustrative examples of suitable mechanisms for producing hydrogen gas from feedstock supply stream 68 include steam reforming and autothermal reforming, in which reforming catalysts are used to produce hydrogen gas from a feedstock supply stream 68 containing water and at least one carbon-containing feedstock. Other examples of suitable mechanisms for producing hydrogen gas include pyrolysis and catalytic partial oxidation of a carbon-containing feedstock, in which case the feedstock supply stream 68 does not contain water. Still another suitable mechanism for producing hydrogen gas is electrolysis, in which case the feedstock is water. Illustrative examples of suitable carbon-containing feedstocks include at least one hydrocarbon or alcohol. Illustrative examples of suitable hydrocarbons include methane, propane, natural gas, diesel, kerosene, gasoline and the like. Illustrative examples of suitable alcohols include methanol, ethanol, and polyols, such as ethylene glycol and propylene glycol.

The hydrogen-generation assembly 46 may utilize more than a single hydrogen-producing mechanism in the hydrogen-producing region 70 and may include more than one hydrogen-producing region. Each of these mechanisms is driven by, and results in, different thermodynamic balances in the hydrogen-generation assembly 46. Accordingly, the hydrogen-generation assembly 46 may further include a temperature modulating assembly 71, such as a heating assembly and/or a cooling assembly. The temperature modulating assembly 71 may be configured as part of the fuel processing system 64 or may be an external component that is in thermal and/or fluid communication with the hydrogen-producing region 70. The temperature modulating assembly 71 may consume a fuel stream, such as to generate heat. While not required in all embodiments of the present disclosure, the fuel stream may be delivered from the feedstock delivery system. For example, and as indicated in dashed lines in FIG. 1, this fuel, or feedstock, may be received from the feedstock delivery system 58 via a fuel supply stream 69. The fuel supply stream 69 may include combustible fuel or, alternatively, may include fluids to facilitate cooling. The temperature modulating assembly 71 may also receive some or all of its feedstock from other sources or supply systems, such as from additional storage tanks. It may also receive the air stream from any suitable source, including the environment within which the assembly is used. Blowers, fans and/or compressors may be used to provide the air stream, but this is not required to all embodiments.

The temperature modulating assembly 71 may include one or more heat exchangers, burners, combustion systems, and other such devices for supplying heat to regions of the fuel processing system and/or other portions of assembly 56. Depending on the configuration of the hydrogen-generation assembly 46, the temperature modulating assembly 71 may also, or alternatively, include heat exchangers, fans, blowers, cooling systems, and other such devices for cooling regions of the fuel processing system 64 or other portions of assembly 56. For example, when the fuel processing system 64 is configured with a hydrogen-producing region 70 based on steam reforming or another endothermic reaction, the temperature modulating assembly 71 may include systems for supplying heat to maintain the temperature of the hydrogen-producing region 70 and the other components in the proper range.

When the fuel processing system is configured with a hydrogen-producing region 70 based on catalytic partial oxidation or another exothermic reaction, the temperature modulating assembly 71 may include systems for removing heat, i.e., supplying cooling, to maintain the temperature of the fuel processing system in the proper range. As used herein, the term "heating assembly" is used to refer generally to temperature modulating assemblies that are configured to supply heat or otherwise increase the temperature of all or selected regions of the fuel processing system. As used herein, the term "cooling assembly" is used to refer generally to temperature moderating assemblies that are configured to cool, or reduce the temperature of, all or selected regions of the fuel processing system.

Figure 2:
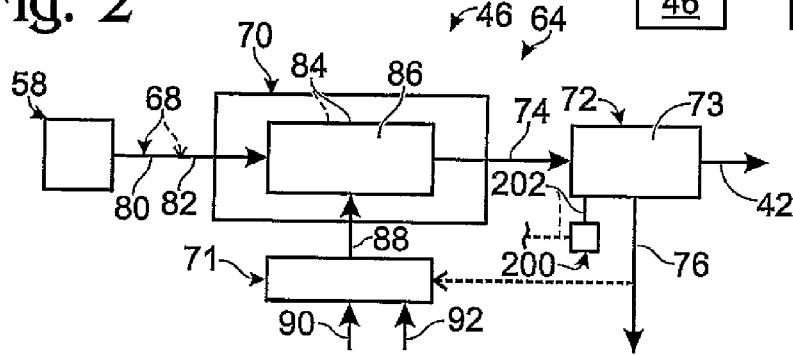
FIG. 2 is a schematic view of a hydrogen-producing assembly in the form of a steam reformer adapted to produce a reformate stream containing hydrogen gas and other gases from water and at least one carbon-containing feedstock.

In FIG. 2, an illustrative example of a hydrogen-generation assembly 46 that includes fuel processing system 64 with a hydrogen-producing region 70 that is adapted to produce mixed gas stream 74 by steam reforming one or more feedstock supply streams 68 containing water 80 and at least one carbon-containing feedstock 82. As illustrated, region 70 includes at least one reforming catalyst bed 84 containing one or more suitable reforming catalysts 86. In the illustrative example, the hydrogen-producing region may be referred to as a reforming region, and the mixed gas stream may be referred to as a reformate stream.

As also shown in FIGS. 1 and 2, the mixed gas stream is adapted to be delivered to a separation region, or assembly, 72 that includes at least one PSA assembly 73. PSA assembly 73 separates the mixed gas (or reformate) stream into product hydrogen stream 42 and at least one byproduct stream 76 that contains at least a substantial portion of the impurities, or other gases, present in mixed gas stream 74. Byproduct stream 76 may contain no hydrogen gas, but it typically will contain some hydrogen gas. While not required, it is within the scope of the present disclosure that fuel processing system 64 may be adapted to produce one or more byproduct streams containing sufficient amounts of hydrogen (and/or other) gas(es) to be suitable for use as a fuel, or feedstock, stream for a heating assembly for the fuel processing system. In some embodiments, the byproduct stream may have sufficient fuel value (i.e., hydrogen and/or other combustible gas content) to enable the heating assembly, when present, to maintain the hydrogen-producing region at a desired operating temperature or within a selected range of temperatures.

As illustrated in FIG. 2, the hydrogen-generation assembly includes a temperature modulating assembly in the form of a heating assembly 71 that is adapted to produce a heated exhaust stream 88 that is adapted to heat at least the reforming region of the hydrogen-generation assembly. It is within the scope of the present disclosure that stream 88 may be used to heat other portions of the hydrogen-generation assembly and/or energy-producing system 22.

As indicated in dashed lines in FIGS. 1 and 2, it is within the scope of the present disclosure that the byproduct stream from the PSA assembly may form at least a portion of the fuel stream for the heating assembly. Also shown in FIG. 2 are air stream 90, which may be delivered from any suitable air source, and fuel stream 92, which contains any suitable combustible fuel suitable for being combusted with air in the heating assembly. Fuel stream 92 may be used as the sole fuel stream for the heating assembly, but as discussed, it is also within the scope of the disclosure that other combustible fuel streams may be used, such as the byproduct stream from the PSA assembly, the anode exhaust stream from a fuel cell stack, etc. When the byproduct or exhaust streams from other components of system 22 have sufficient fuel value, fuel stream 92 may not be used. When they do not have sufficient fuel value, are used for other purposes, or are not being generated, fuel stream 92 may be used instead or in combination.

Illustrative examples of suitable fuels include one or more of the above-described carbon-containing feedstocks, although others may be used. As an illustrative example of temperatures that may be achieved and/or maintained in hydrogen-producing region 70 through the use of heating assembly 71, steam reformers typically operate at temperatures in the range of 200° C. and 900° C. Temperatures outside of this range are within the scope of the disclosure. When the carbon-containing feedstock is methanol, the steam reforming reaction will typically operate in a temperature range of approximately 200-500° C. Illustrative subsets of this range include 350-450° C., 375-425° C., and 375-400° C. When the carbon-containing feedstock is a hydrocarbon, ethanol, or a similar alcohol, a temperature range of approximately 400-900° C. will typically be used for the steam reforming reaction. Illustrative subsets of this range include 750-850° C., 725-825° C., 650-750° C., 700-800° C., 700-900° C., 500-800° C., 400-600° C., and 600-800° C.

It is within the scope of the present disclosure that the separation region may be implemented within system 22 anywhere downstream from the hydrogen-producing region and upstream from the fuel cell stack. In the illustrative example shown schematically in FIG. 1, the separation region is depicted as part of the hydrogen-generation assembly, but this construction is not required. It is also within the scope of the present disclosure that the hydrogen-generation assembly may utilize a chemical or physical separation process in addition to PSA assembly 73 to remove or reduce the concentration of one or more selected impurities from the mixed gas stream. When separation assembly 72 utilizes a separation process in addition to PSA, the one or more additional processes may be performed at any suitable location within system 22 and are not required to be implemented with the PSA assembly. An illustrative chemical separation process is the use of a methanation catalyst to selectively reduce the concentration of carbon monoxide present in stream 74. Other illustrative chemical separation processes include partial oxidation of carbon monoxide to form carbon dioxide and water-gas shift reactions to produce hydrogen gas and carbon dioxide from water and carbon monoxide. Illustrative physical separation processes include the use of a physical membrane or other barrier adapted to permit the hydrogen gas to flow therethrough but adapted to prevent at least selected impurities from passing therethrough. These membranes may be referred to as being hydrogen-selective membranes. Illustrative examples of suitable membranes are formed from palladium or a palladium alloy and are disclosed in the references incorporated herein.

The hydrogen-generation assembly 46 preferably is adapted to produce at least substantially pure hydrogen gas, and even more preferably, the hydrogen-generation assembly is adapted to produce pure hydrogen gas. For the purposes of the present disclosure, substantially pure hydrogen gas is greater than 90% pure, preferably greater than 95% pure, more preferably greater than 99% pure, and even more preferably greater than 99.5% or even 99.9% pure. Illustrative, nonexclusive examples of suitable fuel processing systems are disclosed in U.S. Pat. Nos. 6,221,117, 5,997,594, 5,861,137, and pending U.S. Patent Application Publication Nos. 2001/0045061, 2003/0192251, and 2003/0223926. The complete disclosures of the above-identified patents and patent applications are hereby incorporated by reference for all purposes.

Hydrogen from the fuel processing system 64 may be delivered to one or more of the storage device 62 and the fuel cell stack 24 via product hydrogen stream 42. Some or all of hydrogen stream 42 may additionally, or alternatively, be delivered, via a suitable conduit, for use in another hydrogen-consuming process, burned for fuel or heat, or stored for later use. With reference to FIG. 1, the hydrogen gas used as a proton source, or reactant, for fuel cell stack 24 may be delivered to the stack from one or more of fuel processing system 64 and storage device 62. Fuel cell stack 24 includes at least one fuel cell 20, and typically includes a plurality of fluidly and electrically interconnected fuel cells. When these cells are connected together in series, the power output of the fuel cell stack is the sum of the power outputs of the individual cells. The cells in stack 24 may be connected in series, parallel, or combinations of series and parallel configurations.

Figure 3:
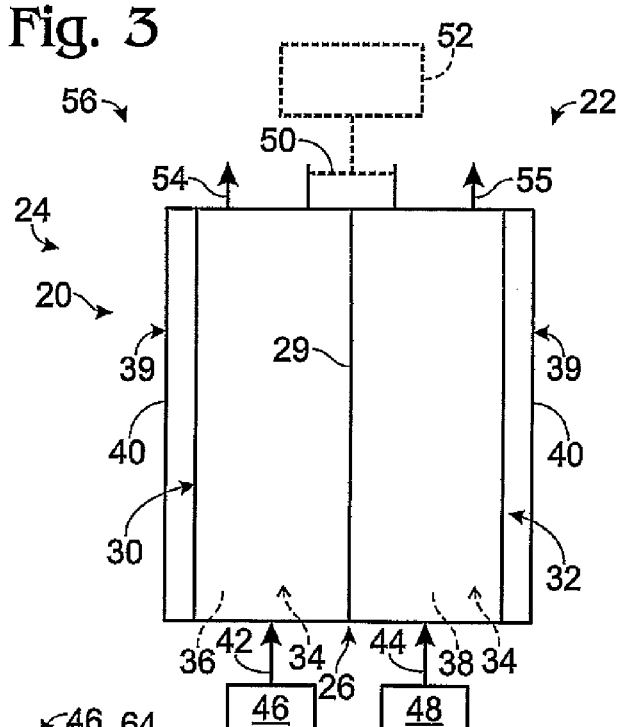
FIG. 3 is a schematic view of a fuel cell, such as may form part of a fuel cell stack used with a hydrogen-generation assembly according to the present disclosure.

FIG. 3 illustrates schematically a fuel cell 20, one or more of which may be configured to form fuel cell stack 24. The fuel cell stacks of the present disclosure may utilize any suitable type of fuel cell, and preferably fuel cells that receive hydrogen and oxygen as proton sources and oxidants. Illustrative examples of types of fuel cells include proton exchange membrane (PEM) fuel cells, alkaline fuel cells, solid oxide fuel cells, molten carbonate fuel cells, phosphoric acid fuel cells, and the like. For the purpose of illustration, an exemplary fuel cell 20 in the form of a PEM fuel cell is schematically illustrated in FIG. 3.

Proton exchange membrane fuel cells typically utilize a membrane-electrode assembly 26 consisting of an ion exchange, or electrolytic, membrane 29 located between an anode region 30 and a cathode region 32. Each region 30 and 32 includes an electrode 34, namely an anode 36 and a cathode 38, respectively. Each region 30 and 32 also includes a support 39, such as a supporting plate 40. Support 39 may form a portion of the bipolar plate assemblies that are discussed in more detail herein. The supporting plates 40 of fuel cells 20 carry the relative voltage potentials produced by the fuel cells.

In operation, hydrogen gas from product stream 42 is delivered to the anode region, and oxidant 44 is delivered to the cathode region. A typical, but not exclusive, oxidant is oxygen. As used herein, hydrogen refers to hydrogen gas and oxygen refers to oxygen gas. The following discussion will refer to hydrogen as the proton source, or fuel, for the fuel cell (stack), and oxygen as the oxidant, although it is within the scope of the present disclosure that other fuels and/or oxidants may be used. Hydrogen and oxygen 44 may be delivered to the respective regions of the fuel cell via any suitable mechanism from respective sources 47 and 48. Illustrative examples of suitable sources 48 of oxygen 44 include a pressurized tank of oxygen or air, or a fan, compressor, blower or other device for directing air to the cathode region.

Hydrogen and oxygen typically combine with one another via an oxidation-reduction reaction. Although membrane 29 restricts the passage of a hydrogen molecule, it will permit a hydrogen ion (proton) to pass through it, largely due to the ionic conductivity of the membrane. The free energy of the oxidation-reduction reaction drives the proton from the hydrogen gas through the ion exchange membrane. As membrane 29 also tends not to be electrically conductive, an external circuit 50 is the lowest energy path for the remaining electron, and is schematically illustrated in FIG. 3. In cathode region 32, electrons from the external circuit and protons from the membrane combine with oxygen to produce water and heat.

Also shown in FIG. 3 are an anode purge, or exhaust, stream 54, which may contain hydrogen gas, and a cathode air exhaust stream 55, which is typically at least partially, if not substantially, depleted of oxygen. Fuel cell stack 24 may include a common hydrogen (or other reactant) feed, air intake, and stack purge and exhaust streams, and accordingly will include suitable fluid conduits to deliver the associated streams to, and collect the streams from, the individual fuel cells. Similarly, any suitable mechanism may be used for selectively purging the regions.

In practice, a fuel cell stack 24 will typically contain a plurality of fuel cells with bipolar plate assemblies separating adjacent membrane-electrode assemblies. The bipolar plate assemblies essentially permit the free electron to pass from the anode region of a first cell to the cathode region of the adjacent cell via the bipolar plate assembly, thereby establishing an electrical potential through the stack that may be used to satisfy an applied load. This net flow of electrons produces an electric current that may be used to satisfy an applied load, such as from at least one of an energy-consuming device 52 and the energy-producing system 22.

For a constant output voltage, such as 12 volts or 24 volts, the output power may be determined by measuring the output current. The electrical output may be used to satisfy an applied load, such as from energy-consuming device 52. FIG. 1 schematically depicts that energy-producing system 22 may include at least one energy-storage device 78. Device 78, when included, may be adapted to store at least a portion of the electrical output, or power, 79 from the fuel cell stack 24. An illustrative example of a suitable energy-storage device 78 is a battery, but others may be used. Energy-storage device 78 may additionally or alternatively be used to power the energy-producing system 22 during start-up of the system.

The at least one energy-consuming device 52 may be electrically coupled to the energy-producing system 22, such as to the fuel cell stack 24 and/or one or more energy-storage devices 78 associated with the stack. Device 52 applies a load to the energy-producing system 22 and draws an electric current from the system to satisfy the load. This load may be referred to as an applied load, and may include thermal and/or electrical load(s). It is within the scope of the present disclosure that the applied load may be satisfied by the fuel cell stack, the energy-storage device, or both the fuel cell stack and the energy-storage device. Illustrative examples of devices 52 include motor vehicles, recreational vehicles, boats and other sea craft, and any combination of one or more residences, commercial offices or buildings, neighborhoods, tools, lights and lighting assemblies, appliances, computers, industrial equipment, signaling and communications equipment, radios, electrically powered components on boats, recreational vehicles or other vehicles, battery chargers and even the balance-of-plant electrical requirements for the energy-producing system 22 of which fuel cell stack 24 forms a part. As indicated in dashed lines at 77 in FIG. 1, the energy-producing system may, but is not required to, include at least one power management module 77. Power management module 77 includes any suitable structure for conditioning or otherwise regulating the electricity produced by the energy-producing system, such as for delivery to energy-consuming device 52. Module 77 may include such illustrative structure as buck or boost converters, inverters, power filters, and the like.

Figure 4:
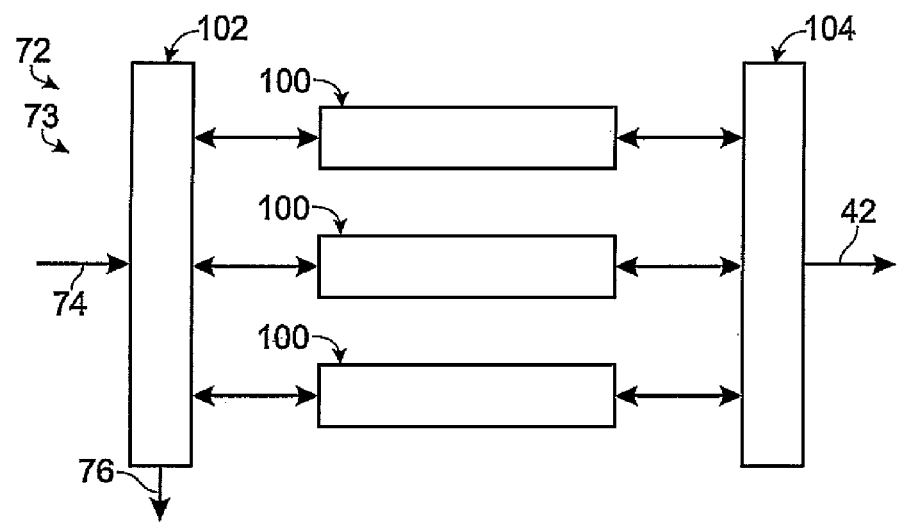
FIG. 4 is a schematic view of a pressure swing adsorption assembly that may be used according to the present disclosure.

In FIG. 4 an illustrative example of a PSA assembly 73 is shown. As shown, assembly 73 includes a plurality of adsorbent beds 100 that are fluidly connected via distribution assemblies 102 and 104. Beds 100 may additionally or alternatively be referred to as adsorbent chambers or adsorption regions. The distribution assemblies have been schematically illustrated in FIG. 4 and may include any suitable structure for selectively establishing and restricting fluid flow between the beds and/or the input and output streams of assembly 73. As shown, the input and output streams include at least mixed gas stream 74, product hydrogen stream 42, and byproduct stream 76. Illustrative examples of suitable structures include one or more of manifolds, such as distribution and collection manifolds that are respectively adapted to distribute fluid to and collect fluid from the beds, and valves, such as check valves, solenoid valves, purge valves, and the like. In the illustrative example, three beds 100 are shown, but it is within the scope of the present disclosure that the number of beds may vary, such as to include more or less beds than shown in FIG. 4. Typically, assembly 73 will include at least two beds, and often will include three, four, or more beds. While not required, assembly 73 is preferably adapted to provide a continuous flow of product hydrogen stream, with at least one of the plurality of beds exhausting this stream when the assembly is in use and receiving a continuous flow of mixed gas stream 74.

In the illustrative example, distribution assembly 102 is adapted to selectively deliver mixed gas stream 74 to the plurality of beds and to collect and exhaust byproduct stream 76, and distribution assembly 104 is adapted to collect the purified hydrogen gas that passes through the beds and which forms product hydrogen stream 42, and in some embodiments to deliver a portion of the purified hydrogen gas to the beds for use as a purge stream. The distribution assemblies may be configured for fixed or rotary positioning relative to the beds. Furthermore, the distribution assemblies may include any suitable type and number of structures and devices to selectively distribute, regulate, meter, prevent and/or collect flows of the corresponding gas streams. As illustrative, non-exclusive examples, distribution assembly 102 may include mixed gas and exhaust manifolds, or manifold assemblies, and distribution assembly 104 may include product and purge manifolds, or manifold assemblies. In practice, PSA assemblies that utilize distribution assemblies that rotate relative to the beds may be referred to as rotary pressure swing adsorption assemblies, and PSA assemblies in which the manifolds and beds are not adapted to rotate relative to each other to selectively establish and restrict fluid connections may be referred to as fixed bed, or discrete bed, pressure swing adsorption assemblies. Both constructions are within the scope of the present disclosure.

Gas purification by pressure swing adsorption involves sequential pressure cycling and flow reversal of gas streams relative to the adsorbent beds. In the context of purifying a mixed gas stream comprised substantially of hydrogen gas, the mixed gas stream is delivered under relatively high pressure to one end of the adsorbent beds and thereby exposed to the adsorbent(s) contained in the adsorbent region thereof. Illustrative examples of delivery pressures for mixed gas stream 74 include pressures in the range of 40-200 psi, such as pressures in the range of 50-150 psi, 50-100 psi, 100-150 psi, 70-100 psi, etc., although pressures outside of this range are within the scope of the present disclosure. As the mixed gas stream flows through the adsorbent region, carbon monoxide, carbon dioxide, water and/or other ones of the impurities, or other gases, are adsorbed, and thereby at least temporarily retained, on the adsorbent. This is because these gases are more readily adsorbed on the selected adsorbents used in the PSA assembly. The remaining portion of the mixed gas stream, which now may perhaps more accurately be referred to as a purified hydrogen stream, passes through the bed and is exhausted from the other end of the bed. In this context, hydrogen gas may be described as being the less readily adsorbed component, while carbon monoxide, carbon dioxide, etc. may be described as the more readily adsorbed components of the mixed gas stream. The pressure of the product hydrogen stream is typically reduced prior to utilization of the gas by the fuel cell stack.

To remove the adsorbed gases, the flow of the mixed gas stream is stopped, the pressure in the bed is reduced, and the now desorbed gases are exhausted from the bed. The desorption step often includes selectively decreasing the pressure within the adsorbent region through the withdrawal of gas, typically in a countercurrent direction relative to the feed direction. This desorption step may also be referred to as a depressurization, or blowdown, step. This step often includes or is performed in conjunction with the use of a purge gas stream, which is typically delivered in a countercurrent flow direction to the direction at which the mixed gas stream flows through the adsorbent region. An illustrative example of a suitable purge gas stream is a portion of the product hydrogen stream, as this stream is comprised of hydrogen gas, which is less readily adsorbed than the adsorbed gases. Other gases may be used in the purge gas stream, although these gases preferably are less readily adsorbed than the adsorbed gases, and even more preferably are not adsorbed, or are only weakly adsorbed, on the adsorbent(s) being used.

As discussed, this desorption step may include drawing an at least partial vacuum on the bed, but this is not required. While not required, it is often desirable to utilize one or more equalization steps, in which two or more beds are fluidly interconnected to permit the beds to equalize the relative pressures therebetween. For example, one or more equalization steps may precede the desorption and pressurization steps. Prior to the desorption step, equalization is used to reduce the pressure in the bed and to recover some of the purified hydrogen gas contained in the bed, while prior to the (re)pressurization step, equalization is used to increase the pressure within the bed. Equalization may be accomplished using cocurrent and/or countercurrent flow of gas. After the desorption and/or purge step(s) of the desorbed gases is completed, the bed is again pressurized and ready to again receive and remove impurities from the portion of the mixed gas stream delivered thereto.

For example, when a bed is ready to be regenerated, it is typically at a relatively high pressure and contains a quantity of hydrogen gas. While this gas (and pressure) may be removed simply by venting the bed, other beds in the assembly will need to be pressurized prior to being used to purify the portion of the mixed gas stream delivered thereto. Furthermore, the hydrogen gas in the bed to be regenerated preferably is recovered so as to not negatively impact the efficiency of the PSA assembly. Therefore, interconnecting these beds in fluid communication with each other permits the pressure and hydrogen gas in the bed to be regenerated to be reduced while also increasing the pressure and hydrogen gas in a bed that will be used to purify impure hydrogen gas (i.e., mixed gas stream 74) that is delivered thereto. In addition to, or in place of, one or more equalization steps, a bed that will be used to purify the mixed gas stream may be pressurized prior to the delivery of the mixed gas stream to the bed. For example, some of the purified hydrogen gas may be delivered to the bed to pressurize the bed. While it is within the scope of the present disclosure to deliver this pressurization gas to either end of the bed, in some embodiments it may be desirable to deliver the pressurization gas to the opposite end of the bed than the end to which the mixed gas stream is delivered.

The above discussion of the general operation of a PSA assembly has been somewhat simplified. Illustrative examples of pressure swing adsorption assemblies, including components thereof and methods of operating the same, are disclosed in U.S. Pat. Nos. 3,564,816, 3,986,849, 5,441,559, 6,692,545, and 6,497,856, the complete disclosures of which are hereby incorporated by reference for all purposes.

Figure 5:
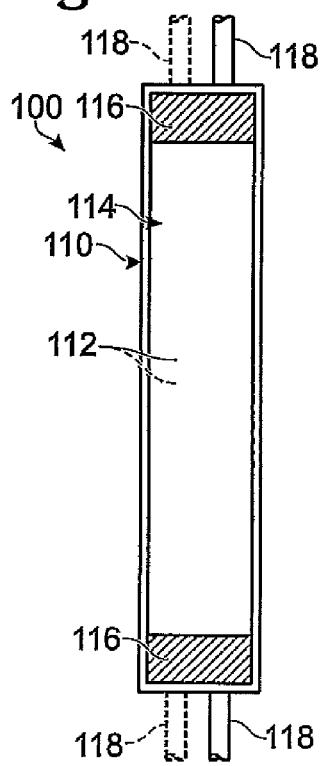
FIG. 5 is a schematic cross-sectional view of an adsorbent bed that may be used with PSA assemblies according to the present disclosure.

In FIG. 5, an illustrative example of an adsorbent bed 100 is schematically illustrated. As shown, the bed defines an internal compartment 110 that contains at least one adsorbent 112, with each adsorbent being adapted to adsorb one or more of the components of the mixed gas stream. It is within the scope of the present disclosure that more than one adsorbent may be used. For example, a bed may include more than one adsorbent adapted to adsorb a particular component of the mixed gas stream, such as to adsorb carbon monoxide, and/or two or more adsorbents that are each adapted to adsorb a different component of the mixed gas stream. Similarly, an adsorbent may be adapted to adsorb two or more components of the mixed gas stream. Illustrative examples of suitable adsorbents include activated carbon, alumina and zeolite adsorbents. An additional example of an adsorbent that may be present within the adsorbent region of the beds is a desiccant that is adapted to adsorb water present in the mixed gas stream. Illustrative desiccants include silica and alumina gels. When two or more adsorbents are utilized, they may be sequentially positioned (in a continuous or discontinuous relationship) within the bed or may be mixed together. It should be understood that the type, number, amount and form of adsorbent in a particular PSA assembly may vary, such as according to one or more of the following factors: the operating conditions expected in the PSA assembly, the size of the adsorbent bed, the composition and/or properties of the mixed gas stream, the desired application for the product hydrogen stream produced by the PSA assembly, the operating environment in which the PSA assembly will be used, user preferences, etc.

When the PSA assembly includes a desiccant or other water-removal composition or device, it may be positioned to remove water from the mixed gas stream prior to adsorption of other impurities from the mixed gas stream. One reason for this is that water may negatively affect the ability of some adsorbents to adsorb other components of the mixed gas stream, such as carbon monoxide. An illustrative example of a water-removal device is a condenser, but others may be used between the hydrogen-producing region and adsorbent region, as schematically illustrated in dashed lines at 122 in FIG. 1. For example, at least one heat exchanger, condenser or other suitable water-removal device may be used to cool the mixed gas stream prior to delivery of the stream to the PSA assembly. This cooling may condense some of the water present in the mixed gas stream. Continuing this example, and to provide a more specific illustration, mixed gas streams produced by steam reformers tend to contain at least 10%, and often at least 15% or more water when exhausted from the hydrogen-producing (i.e., the reforming) region of the fuel processing system. These streams also tend to be fairly hot, such as having a temperature of at least 300° C. (in the case of many mixed gas streams produced from methanol or similar carbon-containing feedstocks), and at least 600-800° C. (in the case of many mixed gas streams produced from natural gas, propane or similar carbon-containing feedstocks). When cooled prior to delivery to the PSA assembly, such as to an illustrative temperature in the range of 25-100° C. or even 40-80° C., most of this water will condense. The mixed gas stream may still be saturated with water, but the water content will tend to be less than 5 wt %.

The adsorbent(s) may be present in the bed in any suitable form, illustrative examples of which include particulate form, bead form, porous discs or blocks, coated structures, laminated sheets, fabrics, and the like. When positioned for use in the beds, the adsorbents should provide sufficient porosity and/or gas flow paths for the non-adsorbed portion of the mixed gas stream to flow through the bed without significant pressure drop through the bed. As used herein, the portion of a bed that contains adsorbent will be referred to as the adsorbent region of the bed. In FIG. 5, an adsorbent region is indicated generally at 114. Beds 100 also may (but are not required to) include partitions, supports, screens and other suitable structure for retaining the adsorbent and other components of the bed within the compartment, in selected positions relative to each other, in a desired degree of compression, etc. These devices are generally referred to as supports and are generally indicated in FIG. 5 at 116. Therefore, it is within the scope of the present disclosure that the adsorbent region may correspond to the entire internal compartment of the bed, or only a subset thereof. Similarly, the adsorbent region may be comprised of a continuous region or two or more spaced apart regions without departing from the scope of the present disclosure.

Figure 6:
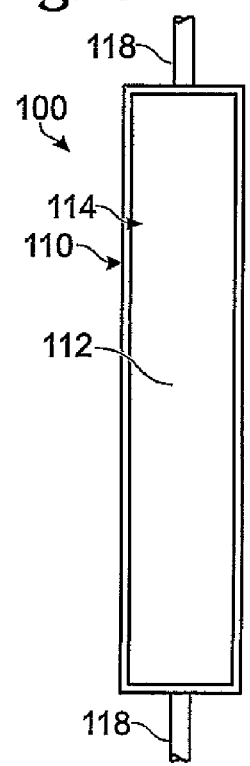
FIG. 6 is a schematic cross-sectional view of another adsorbent bed that may be used with PSA assemblies according to the present disclosure.
Figure 7:
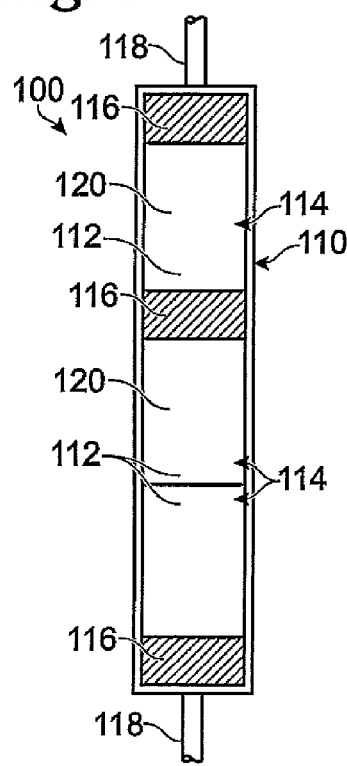
FIG. 7 is a schematic cross-sectional view of another adsorbent bed that may be used with PSA assemblies according to the present disclosure.

In the illustrated example shown in FIG. 5, bed 100 includes at least one port 118 associated with each end region of the bed. As indicated in dashed lines, it is within the scope of the present disclosure that either or both ends of the bed may include more than one port. Similarly, it is within the scope of the disclosure that the ports may extend laterally from the beds or otherwise have a different geometry than the schematic examples shown in FIG. 5. Regardless of the configuration and/or number of ports, the ports are collectively adapted to deliver fluid for passage through the adsorbent region of the bed and to collect fluid that passes through the adsorbent region. As discussed, the ports may selectively, such as depending upon the particular implementation of the PSA assembly and/or stage in the PSA cycle, be used as an input port or an output port. For the purpose of providing a graphical example, FIG. 6 illustrates a bed 100 in which the adsorbent region extends along the entire length of the bed, i.e., between the opposed ports or other end regions of the bed. In FIG. 7, bed 100 includes an adsorbent region 114 that includes discontinuous subregions 120.

During use of an adsorbent bed, such as bed 100, to adsorb impurity gases (namely the gases with greater affinity for being adsorbed by the adsorbent), a mass-transfer zone will be defined in the adsorbent region. More particularly, adsorbents have a certain adsorption capacity, which is defined at least in part by the composition of the mixed gas stream, the flow rate of the mixed gas stream, the operating temperature and/or pressure at which the adsorbent is exposed to the mixed gas stream, any adsorbed gases that have not been previously desorbed from the adsorbent, etc. As the mixed gas stream is delivered to the adsorbent region of a bed, the adsorbent at the end portion of the adsorbent region proximate the mixed gas delivery port will remove impurities from the mixed gas stream. Generally, these impurities will be adsorbed within a subset of the adsorbent region, and the remaining portion of the adsorbent region will have only minimal, if any, adsorbed impurity gases. This is somewhat schematically illustrated in FIG. 8, in which adsorbent region 114 is shown including a mass transfer zone, or region, 130.

As the adsorbent in the initial mass transfer zone continues to adsorb impurities, it will near or even reach its capacity for adsorbing these impurities. As this occurs, the mass transfer zone will move toward the oppose end of the adsorbent region. More particularly, as the flow of impurity gases exceeds the capacity of a particular portion of the adsorbent region (i.e., a particular mass transfer zone) to adsorb these gases, the gases will flow beyond that region and into the adjoining portion of the adsorbent region, where they will be adsorbed by the adsorbent in that portion, effectively expanding and/or moving the mass transfer zone generally toward the opposite end of the bed.

Figure 8:
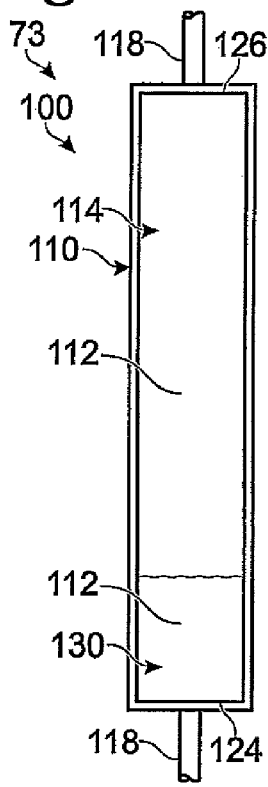
FIG. 8 is a schematic cross-sectional view of the adsorbent bed of FIG. 6 with a mass transfer zone being schematically indicated.
Figure 9:
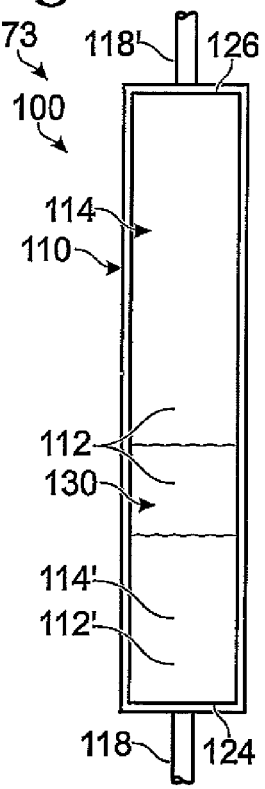
FIG. 9 is a schematic cross-sectional view of the adsorbent bed of FIG. 8 with the mass transfer zone moved along the adsorbent region of the bed toward a distal, or product, end of the adsorbent region.

This description is somewhat simplified in that the mass transfer zone often does not define uniform beginning and ending boundaries along the adsorbent region, especially when the mixed gas stream contains more than one gas that is adsorbed by the adsorbent. Similarly, these gases may have different affinities for being adsorbed and therefore may even compete with each other for adsorbent sites. However, a substantial portion (such as at least 70% or more) of the adsorption will tend to occur in a relatively localized portion of the adsorbent region, with this portion, or zone, tending to migrate from the feed end to the product end of the adsorbent region during use of the bed. This is schematically illustrated in FIG. 9, in which mass transfer zone 130 is shown moved toward port 118' relative to its position in FIG. 8. Accordingly, the adsorbent 112' in portion 114' of the adsorbent region will have a substantially reduced capacity, if any, to adsorb additional impurities. Described in other terms, adsorbent 112' may be described as being substantially, if not completely, saturated with adsorbed gases. In FIGS. 8 and 9, the feed and product ends of the adsorbent region are generally indicated at 124 and 126 and generally refer to the portions of the adsorbent region that are proximate, or closest to, the mixed gas delivery port and the product port of the bed.

During use of the PSA assembly, the mass transfer zone will tend to migrate toward and away from ends 124 and 126 of the adsorbent region. More specifically, and as discussed, PSA is a cyclic process that involves repeated changes in pressure and flow direction. The following discussion will describe the PSA cycle with reference to how steps in the cycle tend to affect the mass transfer zone (and/or the distribution of adsorbed gases through the adsorbent region). It should be understood that the size, or length, of the mass transfer zone will tend to vary during use of the PSA assembly, and therefore tends not to be of a fixed dimension.

At the beginning of a PSA cycle, the bed is pressurized and the mixed gas stream flows under pressure through the adsorbent region. During this adsorption step, impurities (i.e., the other gases) are adsorbed by the adsorbent(s) in the adsorbent region. As these impurities are adsorbed, the mass transfer zone tends to move toward the distal, or product, end of the adsorbent region as initial portions of the adsorbent region become more and more saturated with adsorbed gas. When the adsorption step is completed, the flow of mixed gas stream 74 to the adsorbent bed and the flow of purified hydrogen gas (at least a portion of which will form product hydrogen stream 42) are stopped. While not required, the bed may then undergo one or more equalization steps in which the bed is fluidly interconnected with one or more other beds in the PSA assembly to decrease the pressure and hydrogen gas present in the bed and to charge the receiving bed(s) with pressure and hydrogen gas. Gas may be withdrawn from the pressurized bed from either, or both of, the feed or the product ports. Drawing the gas from the product port will tend to provide hydrogen gas of greater purity than gas drawn from the feed port. However, the decrease in pressure resulting from this step will tend to draw impurities in the direction at which the gas is removed from the adsorbent bed. Accordingly, the mass transfer zone may be described as being moved toward the end of the adsorbent bed closest to the port from which the gas is removed from the bed. Expressed in different terms, when the bed is again used to adsorb impurities from the mixed gas stream, the portion of the adsorbent region in which the majority of the impurities are adsorbed at a given time, i.e., the mass transfer zone, will tend to be moved toward the feed or product end of the adsorbent region depending upon the direction at which the equalization gas is withdrawn from the bed.

The bed is then depressurized, with this step typically drawing gas from the feed port because the gas stream will tend to have a higher concentration of the other gases, which are desorbed from the adsorbent as the pressure in the bed is decreased. This exhaust stream may be referred to as a byproduct, or impurity stream, 76 and may be used for a variety of applications, including as a fuel stream for a burner or other heating assembly that combusts a fuel stream to produce a heated exhaust stream. As discussed, hydrogen-generation assembly 46 may include a heating assembly 71 that is adapted to produce a heated exhaust stream to heat at least the hydrogen-producing region 70 of the fuel processing system. According to Henry's Law, the amount of adsorbed gases that are desorbed from the adsorbent is related to the partial pressure of the adsorbed gas present in the adsorbent bed. Therefore, the depressurization step may include, be followed by, or at least partially overlap in time, with a purge step, in which gas, typically at low pressure, is introduced into the adsorbent bed. This gas flows through the adsorbent region and draws the desorbed gases away from the adsorbent region, with this removal of the desorbed gases resulting in further desorption of gas from the adsorbent. As discussed, a suitable purge gas is purified hydrogen gas, such as previously produced by the PSA assembly. Typically, the purge stream flows from the product end to the feed end of the adsorbent region to urge the impurities (and thus reposition the mass transfer zone) toward the feed end of the adsorbent region. It is within the scope of the disclosure that the purge gas stream may form a portion of the byproduct stream, may be used as a combustible fuel stream (such as for heating assembly 71), and/or may be otherwise utilized in the PSA or other processes.

The illustrative example of a PSA cycle is now completed, and a new cycle is typically begun. For example, the purged adsorbent bed is then repressurized, such as by being a receiving bed for another adsorbent bed undergoing equalization, and optionally may be further pressurized by purified hydrogen gas delivered thereto. By utilizing a plurality of adsorbent beds, typically three or more, the PSA assembly may be adapted to receive a continuous flow of mixed gas stream 74 and to produce a continuous flow of purified hydrogen gas (i.e., a continuous flow of product hydrogen stream 42). While not required, the time for the adsorption step, or stage, often represents one-third to two-thirds of the PSA cycle, such as representing approximately half of the time for a PSA cycle.

It is important to stop the adsorption step before the mass transfer zone reaches the distal end (relative to the direction at which the mixed gas stream is delivered to the adsorbent region) of the adsorbent region. In other words, the flow of mixed gas stream 74 and the removal of product hydrogen stream 42 preferably should be stopped before the other gases that are desired to be removed from the hydrogen gas are exhausted from the bed with the hydrogen gas because the adsorbent is saturated with adsorbed gases and therefore can no longer effectively prevent these impurity gases from being exhausted in what desirably is a purified hydrogen stream. This contamination of the product hydrogen stream with impurity gases that desirably are removed by the PSA assembly may be referred to as breakthrough, in that the impurities gases "break through" the adsorbent region of the bed. Conventionally, carbon monoxide detectors have been used to determine when the mass transfer zone is nearing or has reached the distal end of the adsorbent region and thereby is, or will be, present in the product hydrogen stream. Carbon monoxide detectors are used more commonly than detectors for other ones of the other gases present in the mixed gas stream because carbon monoxide can damage many fuel cells when present in even a few parts per million (ppm). While effective, and within the scope of the present disclosure, this detection mechanism requires the use of carbon monoxide detectors and related detection equipment, which tends to be expensive and increase the complexity of the PSA assembly.

As introduced in connection with FIG. 4, PSA assembly 73 includes distribution assemblies 102 and 104 that selectively deliver and/or collect mixed gas stream 74, product hydrogen stream 42, and byproduct stream 76 to and from the plurality of adsorbent beds 100. As discussed, product hydrogen stream 42 is formed from the purified hydrogen gas streams produced in the adsorbent regions of the adsorbent beds. It is within the scope of the present disclosure that some of this gas may be used as a purge gas stream that is selectively delivered (such as via an appropriate distribution manifold) to the adsorbent beds during the purge and/or blowdown steps to promote the desorption and removal of the adsorbed gases for the adsorbent. The desorbed gases, as well as the purge gas streams that are withdrawn from the adsorbent beds with the desorbed gases collectively may form byproduct stream 76, which as discussed, may be used as a fuel stream for heating assembly 71 or other device that is adapted to receive a combustible fuel stream.

Figure 10:
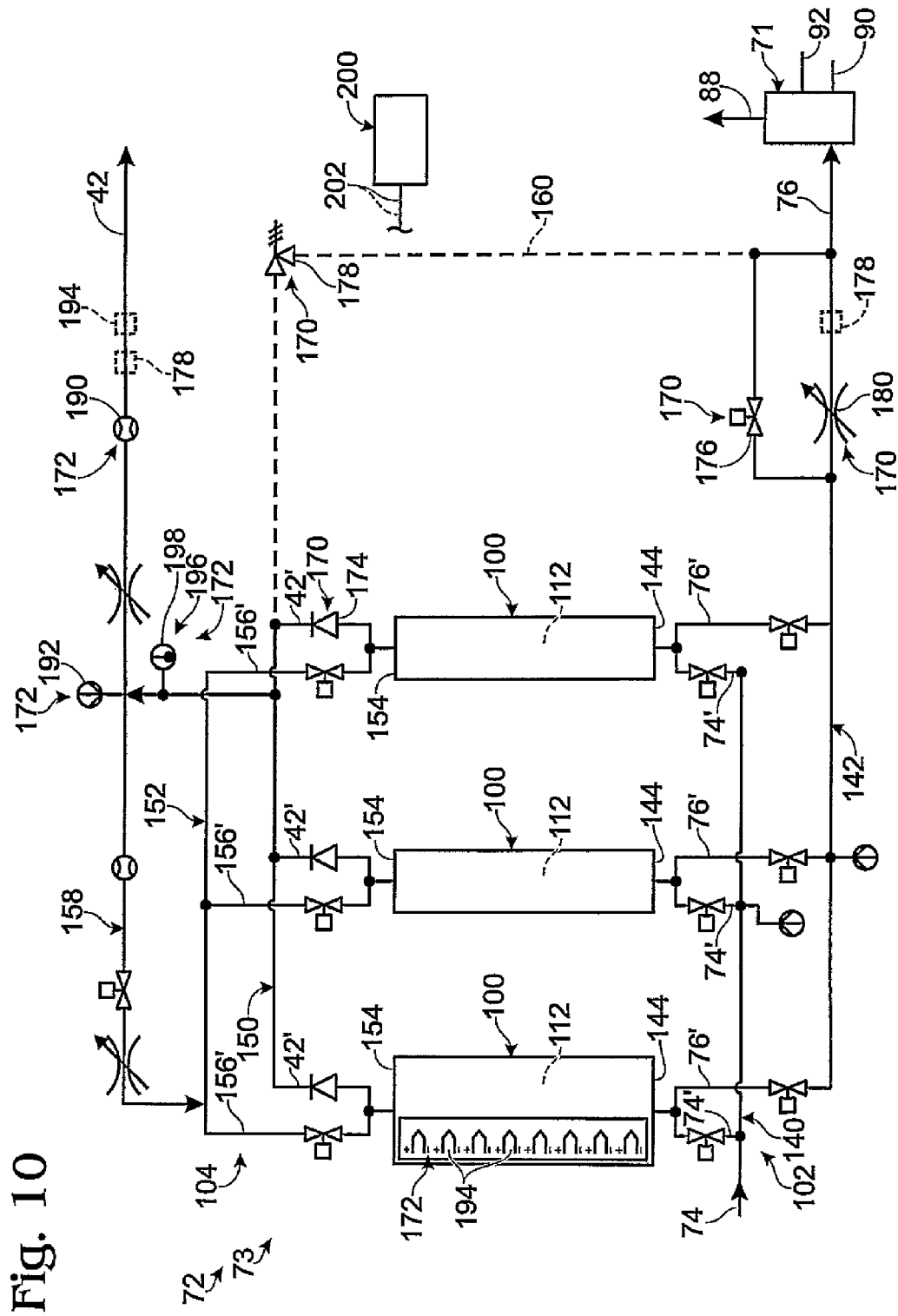
FIG. 10 is a schematic view of another example of a pressure swing adsorption assembly that may be used according to the present disclosure.
Figure 11:
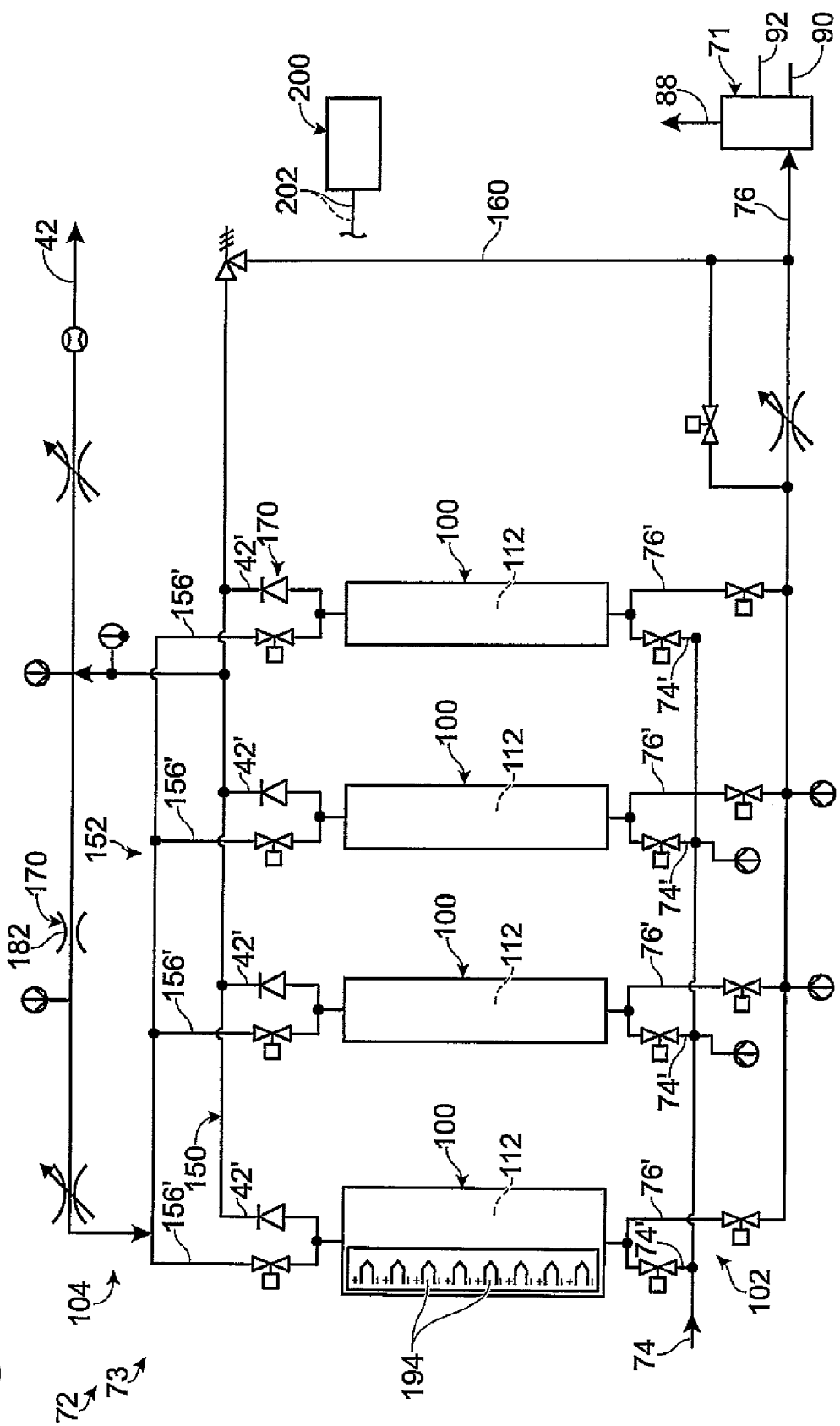
FIG. 11 is a schematic view of another example of a pressure swing adsorption assembly that may be used according to the present disclosure.

FIGS. 10 and 11 provide a somewhat less schematic example of PSA assemblies 73 that include a plurality of adsorbent beds 100. Similar to the illustrative example shown in FIG. 4, three adsorbent beds are shown in FIG. 10, but it is within the scope of the present disclosure that more or less beds may be utilized, as graphically depicted in FIG. 11, in which four beds are shown, although more than four beds may be utilized without departing from the scope of the present disclosure. Similarly, more than one PSA assembly may be used in connection with the same hydrogen-generation assembly and/or fuel cell system. As shown in FIGS. 10 and 11, PSA assembly 73 includes a distribution assembly 102 that includes a mixed gas manifold 140 and an exhaust manifold 142. Mixed gas manifold 140 is adapted to selectively distribute the mixed gas stream to the feed ends 144 of the adsorbent beds, as indicated at 74'. Exhaust manifold 142 is adapted to collect gas that is exhausted from the feed ends of the adsorbent beds, namely, the desorbed other gases, purge gas, and other gas that is not harvested to form product hydrogen stream 42. These exhausted streams are indicated at 76' in FIGS. 10 and 11 and collectively form byproduct stream 76.

FIGS. 10 and 11 also schematically depict byproduct stream 76 being delivered to heating assembly 71 to be combusted with air, such as from air stream 90, to produce heated exhaust stream 88. As also shown in FIGS. 10 and 11, it is within the scope of the present disclosure that heating assembly 71 may, but is not required to, be adapted to receive a fuel stream 92 in addition to byproduct stream 76. In some embodiments, stream 92 may also be referred to as a supplemental fuel stream. Any suitable combustible fuel may be used in stream 92. Illustrative examples of suitable fuels for stream 92 include hydrogen gas, such as hydrogen gas produced by hydrogen-generation assembly 46, and/or any of the above-discussed carbon-containing feedstocks, including without limitation propane, natural gas, methane, and methanol.

As discussed in connection with FIG. 2, when PSA assembly 73 and heating assembly 71 are used in connection with a fuel processing system 64 that includes a hydrogen-producing region 70 that operates at elevated temperatures, the heating assembly may be adapted to heat at least region 70 with exhaust stream 88. For example, stream 88 may heat region 70 to a suitable temperature and/or to within a suitable temperature range, for producing hydrogen gas from one or more feed streams. As also discussed, steam and autothermal reforming reactions are illustrative examples of endothermic processes that may be used to produce mixed gas stream 74 from water and a carbon-containing feedstock, although other processes and/or feed stream components may additionally or alternatively be used to produce mixed gas stream 74. It is also within the scope of the present disclosure that the exhaust stream may be adapted to provide primary heating to heat to a component of a hydrogen-production assembly, fuel cell system, or other implementation of assemblies 71 and 73.

In the illustrative embodiments shown in FIGS. 10 and 11, distribution assembly 104 includes a product manifold 150 and a purge manifold 152. Product manifold 150 is adapted to collect the streams of purified hydrogen gas that are withdrawn from the product ends 154 of the adsorbent beds and from which product hydrogen stream 42 is formed. These streams of purified hydrogen gas are indicated in FIGS. 10 and 11 at 42'. Purge manifold 152 is adapted to selectively deliver a purge gas, such as a portion of the purified hydrogen gas, to the adsorbed beds, such as to promote desorption of the adsorbed impurity gases and thereby regenerate the adsorbent contained therein. The purge gas streams are indicated at 156' and may be collectively referred to as a purge gas stream 156. As indicated at 158, it is within the scope of the present disclosure that the product and purge manifolds may be in fluid communication with each other to selectively divert at least a portion of the purified hydrogen gas (or product hydrogen stream) to be used as purge stream 156. It is also within the scope of the present disclosure that one or more other gases from one or more other sources may additionally or alternatively form at least a portion of purge stream 156.

Although not required, FIGS. 10 and 11 illustrate at 160 that in some embodiments it may be desirable to fluidly connect the product manifold and/or fluid conduits for the product hydrogen stream with the fluid conduits for the byproduct stream. Such a fluid connection may be used to selectively divert at least a portion of the purified (or intended-to-be-purified) hydrogen gas to the heating assembly instead of to the destination to which product hydrogen stream 42 otherwise is delivered. As discussed, examples of suitable destinations include hydrogen storage devices, fuel cell stacks and hydrogen-consuming devices. Illustrative examples of situations in which the diversion of the product hydrogen stream to the heating assembly include if the destination is already receiving its maximum capacity of hydrogen gas, is out of service or otherwise unable to receive any or additional hydrogen gas, if an unacceptable concentration of one or more impurities are detected in the hydrogen gas, if it is necessary to shutdown the hydrogen-generation assembly and/or fuel cell system, if a portion of the product hydrogen stream is needed as a fuel stream for the heating assembly, etc.

In an implemented embodiment of PSA assembly 73, any suitable number, structure and construction of manifolds and fluid conduits for the fluid streams discussed herein may be utilized. Similarly, any suitable number and type of valves or other flow-regulating devices 170 and/or sensors or other property detectors 172 may be utilized, illustrative, non-exclusive examples of which are shown in FIGS. 10 and/or 11. For example, check valves 174, proportioning or other solenoid valves 176, pressure relief valves 178, variable orifice valves 180, and fixed orifices 182 are shown to illustrate non-exclusive examples of flow-regulating devices 170. Similarly, flow meters 190, pressure sensors 192, temperature sensors 194, and composition detectors 196 are shown to illustrate non-exclusive examples of property detectors 172. An illustrative example of a composition detector is a carbon monoxide detector 198, such as to detect the concentration, if any, of carbon monoxide in the purified hydrogen gas streams 42' and/or product hydrogen stream 42.

While not required, it is within the scope of the present disclosure that the PSA assembly may include, be associated with, and/or be in communication with a controller that is adapted to control the operation of at least portions of the PSA assembly and/or an associated hydrogen-generation assembly and/or fuel cell system. A controller is schematically illustrated in FIGS. 2 and 10-11 and generally indicated at 200. Controller 200 may communicate with at least the flow-regulating devices and/or property detectors 172 via any suitable wired and/or wireless communication linkage, as schematically illustrated at 202. This communication may include one- or two-way communication and may include such communication signals as inputs and/or outputs corresponding to measured or computed values, command signals, status information, user inputs, values to be stored, threshold values, etc. As illustrative, non-exclusive examples, controller 200 may include one or more analog or digital circuits, logic units or processors for operating programs stored as software in memory, one or more discrete units in communication with each other, etc. Controller 200 may also regulate or control other portions of the hydrogen-generation assembly or fuel cell system and/or may be in communication with other controllers adapted to control the operation of the hydrogen-generation assembly and/or fuel cell system. Controller 200 is illustrated in FIGS. 10 and 11 as being implemented as a discrete unit. It may also be implemented as separate components or controllers. Such separate controllers, then, can communicate with each other and/or with other controllers present in system 22 and/or assembly 46 via any suitable communication linkages.

In FIGS. 10 and 11, a plurality of temperature sensors 194 are shown associated with one of the illustrated adsorbent beds. It is within the scope of the present disclosure that each or none of the beds may include one or more temperature sensors adapted to detect one or more temperatures associated with the adsorbent bed, the adsorbent in the bed, the adsorbent region of the bed, the gas flowing through the bed, etc. Although not required, PSA assemblies 73 according to the present disclosure may include a temperature-based breakthrough detection system, such as disclosed in U.S. Provisional Patent Application Ser. No. 60/638,086, which was filed on Dec. 20, 2004, is entitled "Temperature-Based Breakthrough Detection and Pressure Swing Adsorption Systems and Fuel Processing Systems Including the Same," and the complete disclosure of which is hereby incorporated by reference for all purposes.

Figure 12:
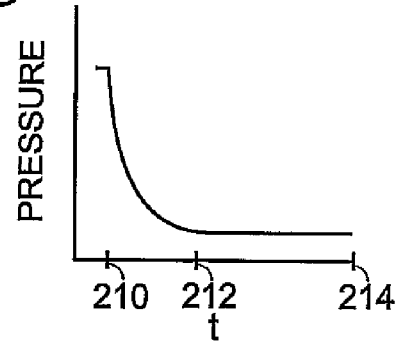
FIG. 12 is a graph depicting pressure within an adsorbent bed of a PSA assembly during the depressurization and purge steps of a PSA cycle.

In FIG. 12, an illustrative (non-exclusive) graph of the pressure within an adsorbent bed during the blowdown, or depressurization, and purge steps of a PSA cycle is shown. At 210, the pressure is indicated prior to the depressurization step, such as after the adsorption step, or stage, has been completed, and perhaps more typically, after one or more equalization steps have been completed. The initiation of the flow of gas from the feed end of the bed during the depressurization, or desorption, step is indicated at 210, and as somewhat schematically indicated, the pressure drops relatively quickly. The rate of decrease may vary from embodiment-to-embodiment, such as responsive to such factors as the pressure within the bed, the gas volume in the bed, the flow rate of gas from the bed, etc. In FIG. 12, and the subsequently discussed FIGS. 13-15, the graphs are intended to provide illustrative representations of the pressure or byproduct stream flow rate as a function of time. Because the graphs are intended for a primary purpose of illustration, the graphs are not labeled for time and instead illustrate relative relationships between these variables.

As discussed, this change in pressure will cause many of the adsorbed gases to be desorbed from the adsorbent, and thereby withdrawn from the adsorbent bed in stream 76'. Stream 76' also contains hydrogen gas, which was present in the bed prior to the start of the depressurization step. The pressure in bed 100 and/or stream 76' will continue to decrease as the flow of gas from the bed continues. In the context of fuel value, the initial flow of stream 76' during the depressurization step will tend to have a different fuel value than the flow of stream 76' mid-way through the depressurization step and at the end of the depressurization step. For example, these differences in fuel value may reflect the relative concentrations of hydrogen gas and the respective ones of the other gases that are present in the stream. Similarly, the flow rate of stream 76' during these illustrative portions of the depressurization step will also tend to vary, with the flow rate tending to decrease during the depressurization step.

At 212, the flow of purge gas, such as in the previously discussed stream 156' shown in FIGS. 10 and 11, is commenced to the adsorbent bed. Although not required, the volume of purge gas delivered to an adsorbent bed in a PSA assembly may be predetermined, such as to be a fixed purge volume. The pressure of stream 156' may vary within the scope of the present disclosure, but the gas is preferably at or near the pressure within bed 100 when the purge step begins. The flow of purge gas through the adsorbent portion will tend to increase the amount of desorbed gases, as the partial pressure of the desorbed gases is reduced by the flow of purge gas through the adsorbent region and then from the adsorbent bed as part of stream 76'. At 214, the flow of purge gas has stopped. In the illustrative example shown in FIG. 12, the depressurization, or blowdown, step is indicated as the time period between times 212 and 210, while the purge step is indicated as the time period between times 214 and 212. While illustrated as a distinct transition between these steps, it is not required to all embodiments that the depressurization of the bed be completed before the flow of purge gas is commenced. Instead, it is within the scope of the present disclosure that the pressure within the adsorbent bed may continue to decrease after the flow of purge gas has commenced.

The optimum volume of purge gas for a particular adsorbent bed may vary according to a variety of factors. Illustrative examples of these factors include one or more of the type of adsorbent being used, the configuration of the adsorbent bed, the size of the adsorbent bed, the pressure of the purge gas, the composition of the purge gas and/or the mixed gas, the pressure of the streams (76') exhausted from the adsorbed bed to form byproduct stream 76, etc. Therefore, an optimum purge volume that is effective for a particular PSA assembly may not be optimum, or perhaps even effective, for a differently configured and/or sized PSA assembly.

The relative time period, or ratio of times, between the depressurization step and the purge step may vary within the scope of the present disclosure, with the illustrated example shown in FIG. 12 intended to illustrate but one of many suitable relationships, or ratios. This ratio may be expressed as a purge-to-blowdown ratio, illustrative examples of which include 1:1 to 3:1, 1.3:1 to 2.5:1, 1.6:1 to 2.3:1, 1.6:1 to 2:1, 1.6:1, 1.8:1, 2:1. 2.2:1, greater than 1.5:1, greater than 2:1, less than 2.5:1, etc. A completing design consideration with a longer purge step, which may tend to increase desorption and/or regeneration of the bed, is that PSA assemblies are preferably adapted to cyclical, continuous use, with the amount of time that a particular bed is in the depressurization and/or purge cycle potentially affecting the amount of time that other beds may be in the same or other steps of the PSA cycle.

The depressurization and purging of an adsorbed bed may occur within a selected time period and/or purge-to-blowdown ratio while producing a variety of flow rates and/or fuel values for stream 76' and the resulting byproduct stream 76. For example, when the depressurization step begins, the adsorbent bed still contains a large amount of hydrogen gas and is still at an elevated pressure. As the depressurization step continues, the pressure and hydrogen gas within the bed will decrease. As the depressurization of the bed continues, the flow rate of stream 76' will decrease as the pressure within the bed decreases. Prior to the start of the flow of purge gas to the bed, the flow of exhaust, or byproduct, gas in stream 76' will be relatively low, as this flow rate decreases with the decreasing pressure in the bed. When the flow of purge gas commences through bed 100, the flow rate of stream 76' will increase, as will its fuel value when the purge gas is a combustible gas, such as hydrogen gas, with a more particular example being purified hydrogen gas produced by the PSA assembly. When the purge step is completed, the flow of stream 76' from that bed is stopped. When this occurs, the fuel stream for heating assembly 71 will be formed by streams 76' from one or more of the other adsorbent beds, such as when the beds are depressurized and/or purged during the PSA cycle, and/or from other sources, such as a supplemental fuel stream.

Figure 13:
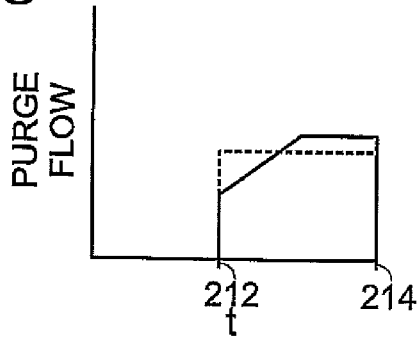
FIG. 13 is a graph depicting the flow rate of purge gas to an adsorbent bed of a PSA assembly during the purge step of a PSA cycle according to the present disclosure.

As discussed, when regenerating the adsorbent in an adsorbent bed 100 of PSA assembly 73, purified hydrogen gas may be used as a purge stream. This flow of purge gas may induce desorption of the adsorbed gases and thereby assist in the regeneration of the adsorbent. Conventionally, the flow of purge gas to an adsorbent bed is delivered at a constant rate, typically for a fixed time period. FIG. 13 presents a graph showing the flow rate of purge gas to adsorbent bed 100 as a function of time. The beginning and end of the purge step are indicated in FIG. 13 at 212 and 214, and correspond to the relative times and purge-to-blowdown ratio discussed above in connection with FIG. 12.

In dashed lines in FIG. 13, the flow rate of purge gas in a PSA cycle that utilizes a constant, or fixed, flow of purge gas to the adsorbent bed is shown. As indicated, the gas is delivered at a constant rate throughout the purge step, with the volume of purge gas delivered to the adsorbent bed being the product of this fixed purge rate and the time period through which this purge gas is delivered to the adsorbent bed. While effective at desorbing adsorbed gases from the adsorbent in the bed, the significant increase, or pulse, in flow rate of gas in stream 76', which may be gas having high fuel value, will tend to cause a substantial increase in the flow and/or temperature of the heated exhaust stream from the heating assembly. This, in turn, will tend to increase the temperature, potentially rapidly, of the structure heated by this stream, such as the hydrogen-producing region of fuel processing system 64. This may result in the structure being overheated, which may damage the structure and/or impair the operation thereof.

Regardless of any potential negative effect on the heated structure(s), the sudden increase in the heated exhaust stream may produce exhaust gases that exceed certain desired, or required, emissions thresholds. For example, the carbon monoxide content of the heated exhaust stream may increase responsive to a sudden increase in the flow of fuel to the heating assembly.

Conversely, during equalization and/or prior to the beginning of the flow of purge gas from the bed and/or at the end of the purge step, stream 76' may contain no flow or only low flow and the flow that exists may have low fuel value. As a result, the heating assembly may not be able to maintain a pilot light or combustion flame without requiring a flow of fuel other than byproduct stream 76. Similarly, when the flow and/or fuel value of stream 76 is low, the heated exhaust stream may not be able to heat the associated structure, such as hydrogen-producing region 70, to a desired temperature or range of temperatures. For example, in the context of a hydrogen-producing region such as a steam reforming region that preferably operates within a selected temperature range to produce hydrogen gas, operating the hydrogen-producing region at a temperature that is below (or above) the desired range will tend to decrease the amount of hydrogen gas in the mixed gas stream, thereby decreasing the conversion, or efficiency, of the hydrogen-generation assembly.

As indicated in solid lines in FIG. 13, it is within the scope of the present disclosure to not use a constant purge gas flow rate. Instead, the flow rate of purge gas to the adsorbent bed is varied during at least portions of the purge step. In the illustrated example, the flow rate of purge gas begins at less than 50% of the flow rate that would be required to deliver a determined volume of purge gas in a determined time period at a constant flow rate of purge gas, such as the volume and time period represented in dashed lines. The flow rate of purge gas increases over time from this initial rate to a maximum flow rate that exceeds the maximum flow rate utilized in the example shown in dashed lines in which a constant flow rate of purge gas is utilized throughout the purge cycle. In the illustrated example, the flow rate is then maintained at this maximum flow rate until the flow of purge gas is stopped. At the end of the purge cycle, the flow rate of stream 76' from the bed being purged has stopped; however, and within the scope of the present disclosure, another bed 100 of the PSA assembly is preferably providing a stream 76' to maintain a substantially continuous, if not completely continuous, flow rate of byproduct stream 76 to the heating assembly, with this stream preferably having a sufficient flow rate and/or heating flow to satisfy the fuel requirements of heating assembly 71 and/or to maintain a continuous combustion process in the heating assembly.

Figure 14:
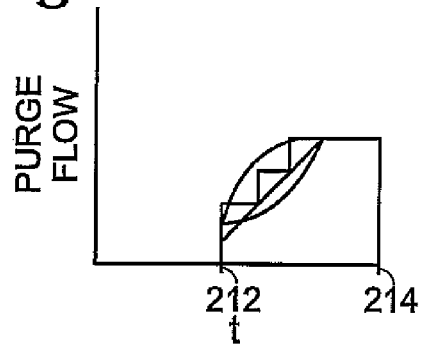
FIG. 14 is a graph depicting illustrative ramped flow rates of purge gas to an adsorbent bed of a PSA assembly during the purge step of a PSA cycle according to the present disclosure.
Figure 15:
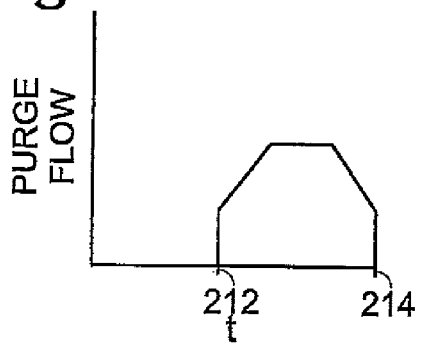
FIG. 15 is a graph depicting illustrative ramped flow rates of purge gas to an adsorbent bed of a PSA assembly during the purge step of a PSA cycle according to the present disclosure.

As variations of the illustrated example, the initial flow rate of purge gas may begin at 10-75% of the average flow rate that would be utilized in a constant flow profile during the entire selected time period for the purge step, and then increase toward at least the average purge flow rate during the first 10-60% of the purge cycle. After this, the flow rate will continue to increase beyond the average purge flow rate for a range of 10-100% of the purge step, and optionally 25-100% of the purge step. For example, the flow rate of purge gas may increase to at least 125%, 150%, 125-200%, etc. of the average flow rate that would be required to a fixed volume of purge gas during the selected time period for the purge step. It is within the scope of the present disclosure that other profiles, or ramps of the purge gas flow rate may be utilized, including profiles in which the flow rate of purge gas during at least one portion, or subset, of the purge step increase or decrease according to one or more of linear, non-linear and/or stepwise, or incremental, amounts. Illustrative examples of other profiles of purge gas flow rates through an adsorbent bed are shown in FIG. 14. As shown in FIG. 15, it is within the scope of the present disclosure that the profile of purge gas flow rates may include a portion of reduced flow, such as during the last 5-50% of the purge step.

Any suitable method or mechanism may be utilized for regulating the flow of purge gas to the adsorbent beds. An illustrative, non-exclusive example is the use of a controller to selectively actuate suitable flow-regulating valves to produce the desired flow rates. As discussed, any suitable type and number of valves may be used, and it is within the scope of the present disclosure to use a different type and/or combination of valves to regulate the flow of gas from the adsorbed bed during the depressurization step than is used during the purge step. It is also within the scope of the present disclosure that that the valve or valve assembly that regulates the flow of gas that will form stream 76' may be selectively used, such as responsive to control signals from a controller, to regulate the flow rate of this gas to adjust the flow rate and/or fuel value of the byproduct stream that is delivered to the heating assembly.

Preferably, the ramped, or staged, purge step as used by the PSA assembly during the PSA cycle produces a byproduct stream that, when delivered as a fuel stream to the heating assembly, is constant, or within a selected range, of a determined, or selected, flow rate, such as +/−5%, 10%, 15%, 20%, 30%, etc. of a selected flow rate. In some embodiments, the selected flow rate corresponds to a flow rate that produces a heated exhaust stream adapted to maintain the hydrogen-producing region of the fuel processing system at a desired temperature and/or within a desired temperature range, such as those discussed previously. Additionally or alternatively, the purge step may be adapted to produce during the PSA cycle a flow of byproduct stream to the heating assembly that is at a constant, or within a selected range of a determined, or selected, fuel value, such as +/−5%, 10%, 15%, 20%, 30%, etc. of a selected fuel value. The byproduct streams preferably maintain either or both of the above-discussed relationships to a selected flow rate and/or fuel value during at least a substantial portion, and even more preferably all of, the time period in which the PSA assembly is used to produce product hydrogen stream 42. When the byproduct stream does not continuously meet either or both of the above-discussed criteria, it is within the scope of the disclosure that it may do so for at least 80%, at least 90%, at least 95%, or more of the cycle.

In some embodiments, the selected fuel value, as associated with the flow rate of stream 76, produces a heated exhaust stream adapted to maintain the hydrogen-producing region of the fuel processing system at a desired temperature and/or within a desired temperature range, such as those discussed previously. For example, the heated exhaust stream may be adapted to maintain the hydrogen-producing region, which in some embodiments may be referred to as a reforming region, of the hydrogen-generation assembly at a relatively constant temperature, such as a temperature in the range of 375-425° C., 400-425° C. and/or 400-450° C. for methanol or similar carbon-containing feedstocks and a temperature in the range of 750-850° C., and preferably 775-825° C., 800-850° C., and/or 800-825° C. for natural gas, propane and similar carbon-containing feedstocks.

While not required, a benefit of ramping, or incrementally increasing, the flow rate of purge gas to the adsorbent bed is that a sudden increase in the flow rate of stream 76 to the heating assembly is prevented. Such a sudden increase may tend to produce a heated exhaust stream having a concentration of at least one component, such as carbon monoxide, that exceeds a selected threshold value, such as 50 ppm or more. Preferably, the ramped purge step of the present disclosure is adapted to produce a heated exhaust stream that throughout the PSA cycle has a carbon monoxide concentration of less than 50 ppm, and preferably, less than 25 ppm, less than 10 ppm, or even less than 5 ppm.

Illustrative, non-exclusive examples of implementations of the systems and methods for ramping, staging or otherwise regulating the flow of purge gas to the adsorbent beds of a pressure swing adsorption assembly include, but are not limited to, one or more of the following implementations, which may be implemented in one or more of a PSA assembly; a PSA assembly adapted to purify hydrogen gas; a hydrogen-generation assembly including a fuel processor adapted to produce a mixed gas stream containing hydrogen gas as its majority component and other gases, and a PSA assembly adapted to produce a product hydrogen stream from the mixed gas stream; a fuel cell system containing a fuel cell stack, a hydrogen-purifying PSA assembly and a source of hydrogen gas to be purified by the PSA assembly (with the source optionally including a fuel processor, and in some embodiments a steam reformer); a hydrogen-generation assembly including a hydrogen-producing region adapted to produce a mixed gas stream containing hydrogen gas as its majority component and other gases, a PSA assembly adapted to remove impurities (including carbon monoxide) from the mixed gas stream (and optionally a fuel cell stack adapted to receive at least a portion of the purified mixed gas stream), and a heating assembly adapted to combust the byproduct stream to heat at least the hydrogen-producing region, with the hydrogen-producing region optionally being a steam or autothermal reforming region:

Regulating the delivery of purge gas to the adsorbent beds to maintain the flow rate of the byproduct stream within +/−5%, 10%, 15%, 20%, 30%, etc. of a selected flow rate;

Regulating the delivery of purge gas to the adsorbent beds to maintain the fuel value of the byproduct stream within +/−5%, 10%, 15%, 20%, 30%, etc. of a selected fuel value;

Delivering a determined volume of purge gas to an adsorbent bed during a determined time period at a varying flow rate;

Progressively increasing the flow rate of purge gas to an adsorbent bed during an initial percentage of the purge cycle, and optionally by maintaining and/or decreasing the flow rate during a subsequent percentage of the purge cycle;

Initially delivering the flow rate of purge gas to an adsorbent bed at a flow rate that is less than 75%, and optionally 50% or less of the average flow rate of purge gas that will be delivered during the purge step of a PSA cycle, and thereafter increasing the flow rate of purge gas to a rate that is greater than the average flow rate of purge gas delivered during the purge step;

After initiating the flow of the volume of purge gas, selectively increasing and/or decreasing the flow rate of purge gas during the time period, and optionally subsequently decreasing and/or increasing the flow rate of purge gas during the time period so that the determined volume of purge gas is delivered during the determined time period;

Regulating the flow rate of purge gas to the adsorbent beds of a PSA assembly to maintain the concentration of carbon monoxide in a heated exhaust stream produced by combusting the byproduct stream from the PSA assembly below a selected threshold, such as 50 ppm, 25 ppm, 10 ppm, 5 ppm, or less;

Selectively distributing a volume of purge gas to the adsorbent beds responsive to a predetermined flow profile having at least one portion in which the flow rate of purge gas is less than an average flow rate of the purge gas delivered during the purge step, and at least one portion in which the flow rate of purge gas is greater than the average flow rate of the purge gas delivered during the purge step;

Regulating the flow rate of purge gas to the adsorbent beds of a PSA assembly to maintain the concentration of at least one component of a heated exhaust stream produced by combusting the byproduct stream from the PSA assembly below a selected threshold value;

Selectively delivering purge gas to the adsorbent beds of a PSA assembly in a variable-flow profile in which the flow rate of purge gas is adjusted to maintain the flow rate of gas from the PSA assembly to a heating assembly at or within a determined range of a threshold value;

Selectively delivering purge gas to the adsorbent beds of a PSA assembly in a variable-flow profile in which the flow rate of purge gas is adjusted to maintain the fuel value and flow rate of gas from the PSA assembly to a heating assembly at or within a determined range of a threshold value;

Regulating the flow rate of purge gas to the adsorbent beds of a PSA assembly to maintain the temperature of a hydrogen-producing region of a fuel processing system that is heated by a heated exhaust stream produced by combusting the byproduct stream of the PSA assembly within a temperature range of 100° C., and preferably 50° C., or less;

Regulating the flow rate of purge gas to the adsorbent beds of a PSA assembly to provide a sufficient flow of byproduct stream to maintain the temperature of the hydrogen-producing region within a selected temperature range and/or above a selected threshold value when heated by a heated exhaust stream produced by combusting the byproduct stream;

Regulating the flow rate of purge gas to the adsorbent beds of a PSA assembly to maintain a continuous flow of the byproduct stream to a heating assembly adapted to utilize the byproduct stream as a fuel stream;

Regulating the flow rate of purge gas to an adsorbent bed of a PSA assembly according to a non-linear flow profile, and optionally according to a profile that includes one or more of incremental changes in flow, stepped (or step-wise) changes in flow, and non-linear changes in flow;

Any of the above systems or methods implemented with a PSA assembly having a plurality of adsorbent beds adapted to receive a mixed gas stream that includes hydrogen gas as its majority component and which is produced by a fuel processing system that includes at least one reforming region adapted to produce the mixed gas stream by steam reforming water and a carbon-containing feedstock, with at least the reforming region(s) of the fuel processing system adapted to be heated by a heating assembly, with the PSA assembly adapted to provide at least one fuel stream to the heating assembly, and optionally in further combination with a fuel cell stack adapted to receive at least a portion of the purified hydrogen gas produced by the PSA assembly;

Methods for implementing the processes of any of the above systems and/or use of any of the above systems; and/or A control system adapted to control the operation of a PSA assembly and/or an associated hydrogen-generation assembly to implement any of the above methods or control systems.

Although discussed herein in the context of a PSA assembly for purifying hydrogen gas, it is within the scope of the present disclosure that the PSA assemblies disclosed herein, as well as the methods of operating the same, may be used in other applications, such as to purify other mixed gas streams in fuel cell or other systems and/or to heat structure other than a hydrogen-producing region of a fuel processing system.

INDUSTRIAL APPLICABILITY

The pressure swing adsorption assemblies and hydrogen-generation and/or fuel cell systems including the same are applicable in the gas generation and fuel cell fields, including such fields in which hydrogen gas is generated, purified and/or consumed to produce an electric current.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

What is claimed is:

1. A method for regulating a temperature of a hydrogen-producing region of a fuel processing system adapted to produce a mixed gas stream containing hydrogen gas and other gases, the method comprising:

producing the mixed gas stream containing hydrogen gas and other gases in a heated hydrogen-producing region of the fuel processing system;

delivering the mixed gas stream to a pressure swing adsorption assembly having at least one adsorbent bed containing an adsorbent and adapted to produce a byproduct stream containing at least a substantial portion of the other gases and a product hydrogen stream containing a greater concentration of hydrogen gas than the mixed gas stream;

adsorbing the other gases from the mixed gas stream to produce the product hydrogen stream containing a greater concentration of hydrogen gas than the mixed gas stream;

depressurizing the at least one adsorbent bed to facilitate desorption of the other gases from the adsorbent;

purging the at least one adsorbent bed with a flow of purge gas to further facilitate desorption of the other gases, wherein the byproduct stream contains at least a portion of the other gases desorbed from the adsorbent during the depressurizing and is formed from the depressurizing and the purging;

combusting the byproduct stream with air in a heating assembly adapted to produce a heated exhaust stream;

heating the hydrogen-producing region of the fuel processing system with the heated exhaust stream;

regulating a flow rate of the byproduct stream that is received and combusted by the heating assembly to maintain the temperature of the hydrogen-producing region within a determined temperature range for producing the mixed gas stream; and regulating the flow of purge gas to the at least one adsorbent bed to produce a sufficient flow of byproduct gas to maintain the hydrogen-producing region within the determined temperature range for producing the mixed gas stream.

2. The method of claim 1, wherein the regulating a flow rate of the byproduct stream includes controlling a fuel value of the byproduct stream.

3. The method of claim 1, wherein the regulating a flow rate of the byproduct stream includes maintaining a fuel value of the byproduct stream within a predetermined range of a determined fuel value.

4. The method of claim 1, wherein the regulating a flow rate of the byproduct stream includes ramping the flow rate of the byproduct stream that is delivered to the heating assembly.

5. The method of claim 4, wherein the method includes regulating the flow rate of the byproduct stream that is delivered to the heating assembly to produce a continuous flow of the byproduct stream.

6. The method of claim 1, wherein the regulating the flow of purge gas includes regulating the flow of purge gas to the at least one adsorbent bed to maintain a fuel value of the byproduct stream within a predetermined range of a determined fuel value.

7. The method of claim 1, wherein the regulating the flow of purge gas includes one or more of selectively increasing and decreasing over a time period a flow rate of purge gas.

8. The method of claim 1, wherein the regulating the flow of purge gas includes ramping a flow rate of purge gas to the at least one adsorbent bed.

9. The method of claim 1, wherein the method includes regulating the flow of purge gas to the at least one adsorbent bed to produce a continuous flow of the byproduct stream.

10. The method of claim 1, wherein the regulating the flow of purge gas includes delivering a flow rate of purge gas at an initial flow rate of purge gas that is less than 75% of an average flow rate of purge gas and thereafter increasing the flow rate of purge gas.

11. The method of claim 1, wherein the regulating the flow of purge gas includes regulating a flow rate of purge gas to the at least one adsorbent bed of the pressure swing adsorption assembly to maintain a concentration of carbon monoxide in the heated exhaust stream below 50 ppm.

12. The method of claim 1, wherein the regulating the flow of purge gas includes selectively delivering a purge stream to the at least one adsorbent bed according to a variable flow profile.

13. The method of claim 1, wherein the regulating the flow of purge gas includes selectively delivering a purge stream to the at least one adsorbent bed according to a linear flow profile.

14. The method of claim 1, wherein the regulating the flow of purge gas includes selectively delivering a purge stream to the at least one adsorbent bed according to a non-linear flow profile.

15. The method of claim 1, wherein the regulating the flow of purge gas includes delivering a flow rate of purge gas at an initial flow rate of purge gas that is greater than 25% and less than 75% of an average flow rate of purge gas and thereafter increasing the flow rate of purge gas.

16. The method of claim 1, wherein the regulating the flow of purge gas includes delivering a flow rate of purge gas at an initial flow rate of purge gas that is greater than 25% and less than 50% of an average flow rate of purge gas and thereafter increasing the flow rate of purge gas.

17. The method of claim 1, wherein the regulating the flow of purge gas includes delivering a flow rate of purge gas at an initial flow rate of purge gas that is 25-75% of an average flow rate of the purge gas during a purge stage of a PSA cycle, and further wherein the initial flow rate is maintained for at least 10% of the purge stage.

18. The method of claim 1, wherein the hydrogen-producing region includes a reforming region adapted to produce the mixed gas stream.

19. The method of claim 18, wherein the hydrogen-producing region includes a stream reforming region adapted to produce the mixed gas stream from water and an alcohol, wherein the determined temperature range is 200-500° C., and further wherein the producing includes delivering at least one feed stream containing water and the alcohol to the hydrogen-producing region and producing the mixed gas stream by chemical reaction of the at least one feed stream at a hydrogen-producing temperature within the determined temperature range.

20. The method of claim 18, wherein the hydrogen-producing region includes a stream reforming region adapted to produce the mixed gas stream from water and a hydrocarbon, wherein the determined temperature range is 400-900° C., and further wherein the producing includes delivering at least one feed stream containing water and the hydrocarbon to the hydrogen-producing region and producing the mixed gas stream by chemical reaction of the at least one feed stream at a hydrogen-producing temperature within the determined temperature range.

21. A method for regulating a temperature of a hydrogen-producing region of a fuel processing system adapted to produce a mixed gas stream containing hydrogen gas and other gases, the method comprising:
producing the mixed gas stream containing hydrogen gas and other gases in a heated hydrogen-producing region of the fuel processing system;
delivering the mixed gas stream to a pressure swing adsorption assembly having at least one adsorbent bed containing an adsorbent and adapted to produce a byproduct stream containing at least a substantial portion of the other gases and a product hydrogen stream containing a greater concentration of hydrogen gas than the mixed gas stream;
adsorbing the other gases from the mixed gas stream to produce the product hydrogen stream containing a greater concentration of hydrogen gas than the mixed gas stream;
depressurizing the at least one adsorbent bed to facilitate desorption of the other gases from the adsorbent, wherein the byproduct stream contains at least a portion of the other gases desorbed from the adsorbent during the depressurizing;
combusting the byproduct stream with air in a heating assembly adapted to produce a heated exhaust stream;
heating the hydrogen-producing region of the fuel processing system with the heated exhaust stream; and
regulating a flow rate of the byproduct stream that is received and combusted by the heating assembly to maintain the temperature of the hydrogen-producing region within a determined temperature range for producing the mixed gas stream, wherein the regulating includes ramping the flow rate of the byproduct stream that is delivered to the heating assembly.

22. The method of claim 21, wherein the regulating includes controlling a fuel value of the byproduct stream.

23. The method of claim 21, wherein the regulating includes maintaining a fuel value of the byproduct stream within a predetermined range of a determined fuel value.

24. The method of claim 21, wherein the method includes regulating the flow rate of the byproduct stream that is delivered to the heating assembly to produce a continuous flow of the byproduct stream.

25. The method of claim 21, wherein the hydrogen-producing region includes a reforming region adapted to produce the mixed gas stream.

26. The method of claim 25, wherein the hydrogen-producing region includes a stream reforming region adapted to produce the mixed gas stream from water and an alcohol, wherein the determined temperature range is 200-500° C., and further wherein the producing includes delivering at least one feed stream containing water and the alcohol to the hydrogen-producing region and producing the mixed gas stream by chemical reaction of the at least one feed stream at a hydrogen-producing temperature within the determined temperature range.

27. The method of claim 25, wherein the hydrogen-producing region includes a stream reforming region adapted to produce the mixed gas stream from water and a hydrocarbon, wherein the determined temperature range is 400-900° C., and further wherein the producing includes delivering at least one feed stream containing water and the hydrocarbon to the hydrogen-producing region and producing the mixed gas stream by chemical reaction of the at least one feed stream at a hydrogen-producing temperature within the determined temperature range.

* * * * *